United States Patent
Marty et al.

(10) Patent No.: US 10,762,642 B2
(45) Date of Patent: Sep. 1, 2020

(54) SYSTEMS AND METHODS FOR INDICATING USER PERFORMANCE IN LAUNCHING A BASKETBALL TOWARD A BASKETBALL HOOP

(71) Applicant: PILLAR VISION, INC., Menlo Park, CA (US)

(72) Inventors: Alan W. Marty, Menlo Park, CA (US); John Carter, Elkmont, AL (US)

(73) Assignee: PILLAR VISION, Inc., Huntsville, AL (US)

( * ) Notice: Subject to any disclaimer, the term of this patent is extended or adjusted under 35 U.S.C. 154(b) by 0 days.

(21) Appl. No.: 16/777,838

(22) Filed: Jan. 30, 2020

(65) Prior Publication Data

US 2020/0167936 A1 May 28, 2020

Related U.S. Application Data

(63) Continuation of application No. 15/624,527, filed on Jun. 15, 2017, now abandoned, which is a
(Continued)

(51) Int. Cl.
*G06K 9/00* (2006.01)
*G06T 7/246* (2017.01)
(Continued)

(52) U.S. Cl.
CPC ............... *G06T 7/246* (2017.01); *G06T 7/80* (2017.01); *H04N 5/2252* (2013.01);
(Continued)

(58) Field of Classification Search
CPC ............ G06T 2207/30221; G06T 7/20; G06T 7/2033; G06T 7/246; G06T 7/80;
(Continued)

(56) References Cited

U.S. PATENT DOCUMENTS 7,094,164 B2 8/2006 Marty et al.
7,214,138 B1 5/2007 Stivers et al.
(Continued)

OTHER PUBLICATIONS

Marty, et al., U.S. Appl. No. 15/624,527, entitled, "True Space Tracking of Axisymmetric Object Flight Using Diameter Measurement," filed Jun. 15, 2017.

*Primary Examiner* — Andrew M Moyer
(74) *Attorney, Agent, or Firm* — Maynard Cooper & Gale, P. C.; Jon E. Holland

(57) ABSTRACT

Methods and apparatus for determining a trajectory of a axisymmetric object in 3-D physical space using a digital camera which records 2-D image data are described. In particular, based upon i) a characteristic length of the axisymmetric object, ii) a physical position of the camera determined from sensors associated with the camera (e.g., accelerometers) and iii) captured 2-D digital images from the camera including a time at which each image is generated relative to one another, a position, a velocity vector and an acceleration vector can be determined in three dimensional physical space for axisymmetric object objects as a function of time. In one embodiment, the method and apparatus can be applied to determine the trajectories of objects in games which utilize axisymmetric object objects, such as basketball, baseball, bowling, golf, soccer, rugby or football.

30 Claims, 12 Drawing Sheets

Related U.S. Application Data continuation of application No. 14/579,916, filed on Dec. 22, 2014, now Pat. No. 9,697,617, which is a continuation of application No. 13/921,162, filed on Jun. 18, 2013, now Pat. No. 8,948,457.

(60) Provisional application No. 61/808,061, filed on Apr. 3, 2013.

(51) Int. Cl.
*H04N 5/225* (2006.01)
*G06T 7/80* (2017.01)

(52) U.S. Cl.
CPC ............... *G06T 2207/10016* (2013.01); *G06T 2207/30224* (2013.01); *G06T 2207/30241* (2013.01)

(58) Field of Classification Search
CPC . G06T 2207/30224; G06T 2207/30241; G06T 2207/10016; H04N 5/2252
USPC .................................................. 382/103, 154
See application file for complete search history.

(56) References Cited

U.S. PATENT DOCUMENTS

| | | |
|---|---|---|
| 7,850,552 B2 | 12/2010 | Marty et al. |
| 7,854,669 B2 | 12/2010 | Marty et al. |
| 8,617,008 B2 | 12/2013 | Marty et al. |
| 8,622,832 B2 | 1/2014 | Marty et al. |
| 8,908,922 B2 | 12/2014 | Marty |
| 8,948,457 B2 | 2/2015 | Marty |
| 9,283,431 B2 | 3/2016 | Marty et al. |
| 9,283,432 B2 | 3/2016 | Marty et al. |
| 9,345,929 B2 | 5/2016 | Marty et al. |
| 9,358,455 B2 | 6/2016 | Marty et al. |
| 9,694,238 B2 | 7/2017 | Marty et al. |
| 9,697,617 B2 | 7/2017 | Marty |
| 10,360,685 B2 | 7/2019 | Marty et al. |
| 2003/0073518 A1* | 4/2003 | Marty ................. A63B 24/0021 473/416 |
| 2004/0017929 A1 | 1/2004 | Bramblet |
| 2008/0219509 A1 | 9/2008 | White et al. |
| 2008/0312010 A1* | 12/2008 | Marty ................. A63B 24/0003 473/447 |
| 2010/0030350 A1* | 2/2010 | House ................. A63B 24/0021 700/91 |
| 2010/0151957 A1 | 6/2010 | Hohla |
| 2010/0316282 A1 | 12/2010 | Hope |
| 2011/0013087 A1* | 1/2011 | House ................. A63B 24/0021 348/564 |
| 2011/0090344 A1* | 4/2011 | Gefen .................... H04N 5/232 348/169 |
| 2011/0143868 A1* | 6/2011 | Marty ....................... G06T 7/70 473/447 |
| 2013/0274034 A1 | 10/2013 | Sawatari |
| 2014/0301601 A1 | 10/2014 | Marty et al. |

* cited by examiner

SYSTEMS AND METHODS FOR INDICATING USER PERFORMANCE IN LAUNCHING A BASKETBALL TOWARD A BASKETBALL HOOP

CROSS-REFERENCE TO RELATED APPLICATIONS

This application claims priority to and is a continuation of U.S. patent application Ser. No. 15/624,527, entitled "True Space Tracking of Axisymmetric Object Flight Using Image Sensor" and filed on Jun. 15, 2017, which is incorporated herein by reference in its entirety and for all purposes. U.S. patent application Ser. No. 15/624,527 claims priority to and is a continuation of U.S. patent application Ser. No. 14/579,916, entitled "True Space Tracking of Axisymmetric Object Flight Using Image Sensor" and filed on Dec. 22, 2014, which is incorporated by reference in its entirety and for all purposes. U.S. patent application Ser. No. 14/579,916 claims priority to and is a continuation of U.S. patent application Ser. No. 13/921,162, entitled "True Space Tracking of Sphere Flight Using Diameter Measurement" and filed on Jun. 18, 2013, which is incorporated by reference in its entirety and for all purposes. U.S. patent application Ser. No. 13/921,162 claims priority under 35 U.S.C. § 119(e) to U.S. Provisional Patent Application No. 61/808,061, entitled "True Space Tracking of Sphere Flight Using Diameter Measurement" and filed on Apr. 3, 2013, which is incorporated by reference in its entirety and for all purposes.

FIELD OF THE INVENTION

The present invention relates generally to devices and systems for sports training and entertainment and more specifically to characterizing ball motion in sporting environments using 2-D image data.

BACKGROUND

There are many different games which involve use of an essentially spherical object or ball. A few examples include basketball, soccer, golf, baseball, softball, tennis, volleyball, racket ball, water-polo, lacrosse, bowling, shot-put, jai alai, polo, handball ping-pong, field hockey, dodgeball, billiards, cricket, kickball, wiffleball, skeeball, pinball and foosball. In each game, a ball is moved in some manner, under control of a game participant, from location to location, sometimes colliding with, passing through or over other objects depending on the rules of the game.

For ball-based games, ball control is integral to the play of the games. Thus, information which quantifiable characterizes the motion of the ball is of interest to participants and spectators alike. As an example, participants can be interested in the information which characterizes the motion of the ball for the purposes of assessing and improving their performance in the game. Whereas for spectators, the information may enhance the entertainment derived from viewing the sport.

Devices which are often used to characterize ball motion can be expensive, can require specialized set-up and can require complex calibration. Thus, the average person doesn't have access to information which characterizes ball motion in most situations. In view of the above, improved methods and apparatus for characterizing ball motion are desired.

SUMMARY

Methods and apparatus for determining a trajectory of a spherical object in 3-D physical space using a digital camera which records 2-D image data are described. Based upon a known size of the ball in 3-D physical space, a position in the 3-D physical space of the camera which is determined from sensors associated with the camera (e.g., accelerometers) and the 2-D image data which provides pixel data, a trajectory of the spherical object in 3-D physical space as a function of time can determined. The method and apparatus can be applied to determine the trajectories of balls used in sports, such as basketball, baseball, bowling, golf and tennis. In particular embodiments, the method and apparatus can be implemented on a mobile computing device including the camera. Information derived from the trajectories can be used to improve performance of participants in the sports, enhance the entertainment value associated with viewing the sports or enhance the entertainment value of video games derived from the sports.

One aspect of the methods and apparatus is related to a non-transitory computer readable medium for storing a computer program used by a computing device where the computer program is executed by the computing device to generate a three dimensional (3-D) trajectory of a ball from two dimensional (2-D) digital image data. The ball can be a spherical object or a non-spherical object, such as a football having an elliptical cross section. The computer readable medium can include 1) computer code for receiving a sequence of 2-D digital images from a digital camera associated with the computing device; 2) computer code for receiving orientation data which is used to determine or to specify an orientation of a lens of the digital camera in 3-D physical space, said lens configured to receive light used to generate the 2-D digital images; 3) computer code for transforming pixel data in each of the 2-D digital images based upon the determined orientation of the lens; 4) computer code for identifying a 2-D representation of a ball captured in the transformed pixel data associated with each of the 2-D digital images; 5) computer code for determining pixel coordinates of the 2-D representation of the ball in each of the 2-D digital images; 6) computer code for determining a characteristic length of the 2-D representation of the ball measured in pixels in each of the 2-D digital images wherein the characteristic length of the 2-D representation varies within the sequence of the 2-D digital images; 7) computer code for determining a distance to the identified 2-D representation of the ball from the lens based upon the characteristic length in the pixels, said distance measured in units associated with 3-D physical space; and 8) computer code for determining 3-D coordinates of the ball as a function of time in the 3-D physical space based upon the determined distance and the pixel coordinates of the 2-D representation of the ball captured in the transformed pixel data associated with each of the 2-D digital images.

BRIEF DESCRIPTION OF THE DRAWINGS

The included drawings are for illustrative purposes and serve only to provide examples of possible structures and process steps for the disclosed inventive systems and methods for providing game services to remote clients. These drawings in no way limit any changes in form and detail that may be made to the invention by one skilled in the art without departing from the spirit and scope of the invention.

DESCRIPTION OF THE PREFERRED EMBODIMENTS

Figure 1:
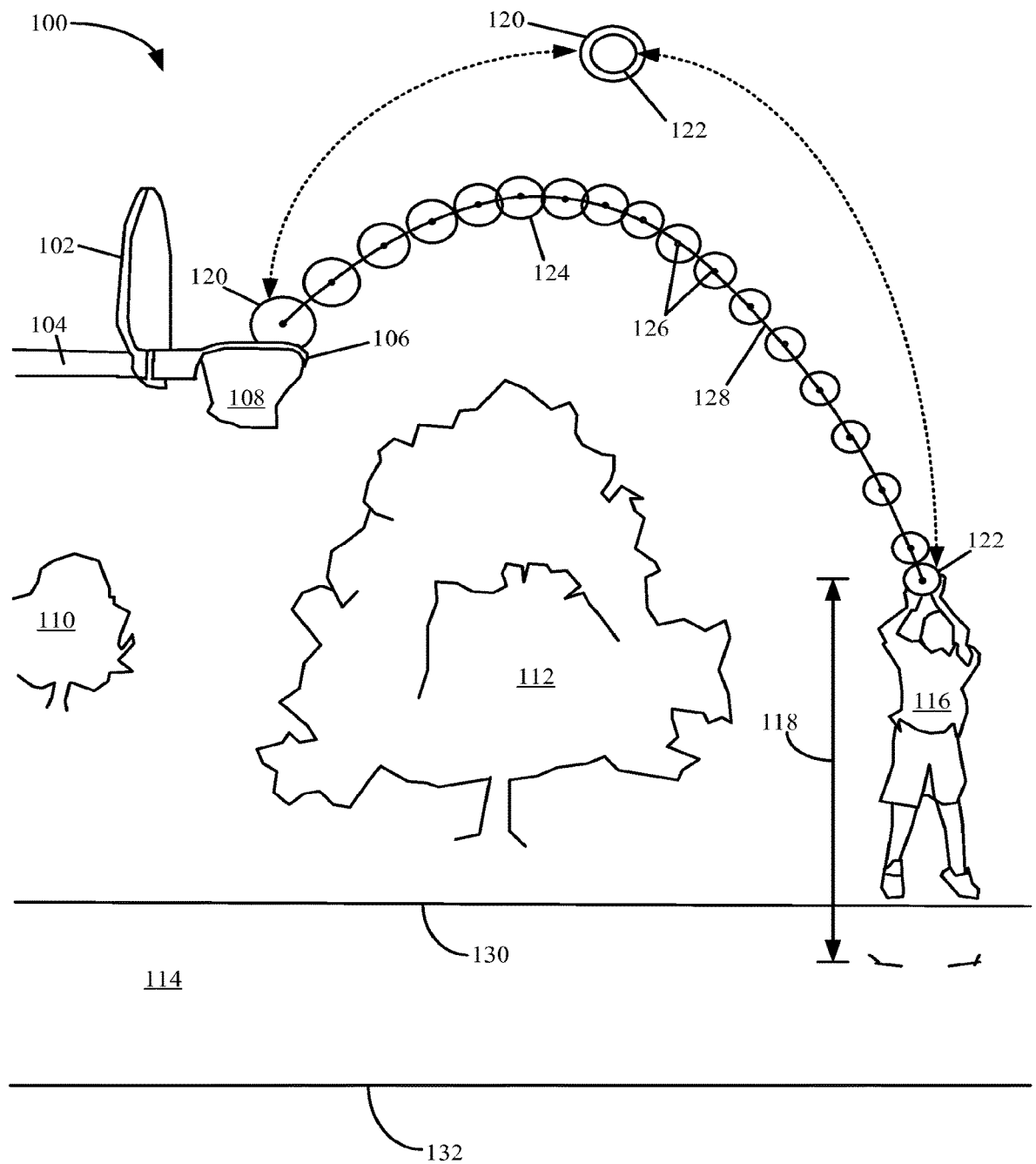
FIG. 1 is a representation of a 2-D composite image including a trajectory of a basketball in flight in accordance with the described embodiments.

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Mobile computing platforms are becoming ubiquitous as reflected in the increasing number of smart phones and tablet computers being sold. Most of these mobile computing platforms include significant computational capabilities and at least one high resolution 2-D digital camera capable of capturing still and video images. In addition, many of these mobile computing platforms have integrated position sensing accelerometers. As will described in more details as follows, the computing, 2-D image capture and sensing capabilities of mobile computing devices can be applied to three dimensional ball tracking.

In alternate embodiments, three dimensional ball tracking can be implemented using an image capture device and computing device configured to operate at a fixed position, such as mounted to wall. The orientation and/or position of the image capture device can be determined using sensor devices coupled to the image capture device. In addition, the orientation and/or position of the image captured device can be directly determined. For example, when mounted to a wall, the orientation and position of the image capture device can be measured by a user and input into the system. These measurements may be provided as part an initial device calibration.

In sports, three dimensional ball tracking is useful for many purposes including training, broadcast enhancement, social sharing and video games. For example, with readily handily mobile computing devices, 3-D ball tracking can be used to provide feedback information which allows a participant to improve in a chosen sporting activity. Broadcast enhancement may involve providing trajectory information associated with 3-D ball tracking, which allows a viewer of a sporting activity, such as a coach or parent, to assess the performance of individuals participating in the activity.

Social sharing can involve a person using their mobile computing device to measure 3-D ball movement associated with their sporting activities, comment on plays and post them to a social media site. Video game play can involve linking a person's gaming activities on a living room gaming console to outside real-life participation in a sport. For example, 3-D ball tracking can be used to assess a person's real-life skill at a sport and then information from the assessment can be used to adjust video game parameters which affect their performance within the video game.

Figure 2:
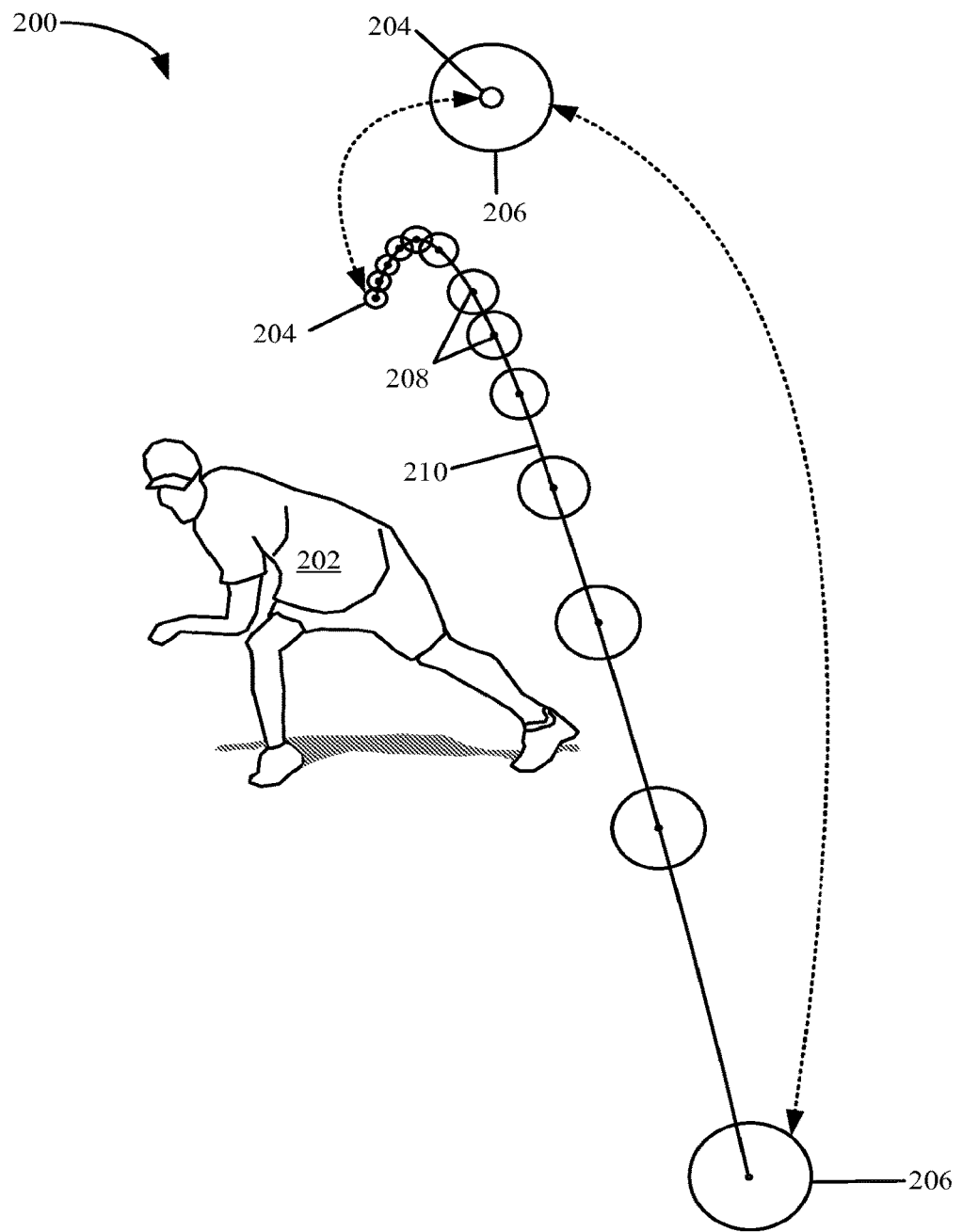
FIG. 2 is a representation of a 2-D composite image including a trajectory of baseball in flight in accordance with the described embodiments.

In more detail, with respect to FIGS. 1 and 2, method and apparatus used to characterize ball motion in 3-D space using 2-D image data and a known size of the ball are briefly described. In particular, application of a method and an apparatus for determining a 3-D trajectory of a basketball or baseball are introduced with respect to FIGS. 1 and 2, respectively. With respect to FIG. 3, 2-D image data capture and manipulation are briefly described. With respect to FIGS. 4A, 4B and 5 reference frames and coordinate transformations derived from position sensing used to work with the 2-D image data are described. A first method of determining a 3-D trajectory of a ball in physical space using 2-D image data and accelerometer data is discussed with respect to FIG. 6. A second method of determining a 3-D trajectory of a ball in physical space using 2-D image data is discussed with respect to FIG. 7. With respect to FIGS. 8A, 8B and 8C, trajectory determination for some non-spherical objects is discussed. Finally, a system which generates and utilizes the 3-D trajectory data in various applications is discussed with respect to FIG. 9.

FIG. 1 is a representation of a 2-D composite image 100 including a trajectory 128 of a basketball in flight. A 2-D composite image 100 with a trajectory of a ball can be generated by capturing a series of 2-D images from a video camera at a determined position, such as a fixed position, and then superimposing the position and size of the basketball in each of the multiple images onto one of the images in the series. The composite image 100 include, images of basketball (e.g., 120 and 122), a basketball hoop 106, net 108, backboard 102, support structure 104, trees (110 and 112), court 114 and edge of the court 130. The basketball is being shot towards the hoop by a person 116. The line 132 represents where the court 114 is cut off in the image. In this example, the image includes trees because the basketball court 114 is outdoors. In other embodiments, images can be captured inside.

In one embodiment, a digital camera on a smart phone can be used to capture the 2-D images used to generate a composite image. The camera can be fixed in placed using a number of methods, such as mounting the smart phone to a flexible tripod (e.g., Joby Gorillapod™, www.Joby.com) which rests upon or is secured to a surface, leaning the smart phone against an object, such as a fence, or holding the smart phone against an object, such as a fence. Other image capture devices can be used a smart phone camera is provided for illustrative purposes only. For example, a tablet computer with an image capture device can be utilized.

In particular embodiments, the 2-D image data from the camera can be provided as a two dimensional array of pixels where a number of values are associated with each pixel and where two pixel coordinates identify a position of each pixel the 2-D array. The size of the pixel array can vary from camera to camera depending on the sensor on the camera and the camera settings. In each of the captured 2-D images, object recognition software can be used to detect the presence of the basketball and determine a pixel position and a size of the basketball in pixels in each image by using the values associated with each pixel.

To generate the representative composite image 100, one of the series of images captured from the video camera can be selected and a basketball with a size and a position as determined from the other images can be superimposed on the one selected 2-D image. If the time between images is small enough, the superimposed basketballs can overlap with one another. The determined positions of the basketball in pixel space can be used to construct a trajectory in pixel space. For instance, as shown in FIG. 1, a trajectory line 128 can be drawn through the determined center of the basketballs (e.g., 126) in pixel space to portray a trajectory of the basketball. The trajectory line 128 can be specified in 2-D pixel coordinates.

To generate a 3-D trajectory in physical space, which can be referred to as true space, an orientation of the camera, i.e., the direction the lens is pointing can be determined using accelerometers in the portable electronic device (e.g., a smart phone). In one embodiment, as is discussed in more detail below, using the accelerometer data, a reference plane relative to the center of the Earth and orientation of the camera relative to the reference plane can be determined. The captured 2-D image data can be projected onto the determined reference plane in pixel space. Next, a known size of the basketball can be used to relate a length in pixels to a length in physical space to determine the position of the basketball on the reference plane in true space, i.e., 3-D physical space.

In other embodiments, the orientation of a camera can be measured by hand and input. For example, a tripod can include rotation joints with angle markings which allow an orientation of the camera to be determined relative to some surface, such as the ground. As another example, a camera on a platform with rotation joints where the rotation joints include markings which allow an orientation of the camera to be determined relative to some surface, such as the ground or a vertical wall, can be used to determine an orientation of the camera. In another example, a user may be able to make measurement with a tape measure, ruler or some other measuring device which allows an orientation of the camera relative to some surface to be determined. These measurements can be input into the system.

In yet other embodiments, the camera position can be assumed to be a certain orientation based upon a specified installation orientation. For example, the camera lens can be included in a device which is coupled to a wall, such that the camera lens is parallel to the wall. Further, the device can be coupled to the wall, such that the bottom of images from an image sensor associated with the camera are parallel to a horizontal surface, such as the floor.

As shown in the 2-D composite image 100, the size of the ball in the image varies along the trajectory line 128. In particular, the size of the basketball 122 at the beginning of the trajectory appears smaller than the size of the basketball 120 near the hoop 106. A size of the basketball 122 near the beginning of the trajectory is shown within the size of the basketball 120 to illustrate the change in size.

The size changes because the basketball is farther away from the image capture device at the beginning of the trajectory and then moves closer to the camera. Thus, as the basketball moves closer to the camera it appears larger in the 2-D image data captured by the camera. For a different shot, with the camera at the same position, the basketball may appear bigger at the beginning of the trajectory (i.e., when it is shot) and then get smaller as basketball approaches the hoop. Further, for the shot in FIG. 1, a camera at a different position, such as one positioned on the other side of the court 114, may generate images where the ball is larger at the beginning of the trajectory and becomes smaller as the ball approaches the hoop 106.

In general, objects appear differently in 2-D image data depending on the position of the camera relative to the object. However, because a sphere is symmetric in any direction, it approximately appears in 2-D image data as a circle from any direction in which it is viewed by the camera as long as lens aberrations and blurring due to pixel size are considered. The size of the circle depends on the distance from the camera to the sphere.

For other non-symmetric objects, this property doesn't hold. For example, a person can appear quite differently in 2-D image data depending on the position relationship of the camera relative to the person. However, for axisymmetric objects, such as an American football, rugby ball, Australian's rules football, Frisbee or discus, it may be possible to identify at least one characteristic length associated with the object from any orientation of the object relative to a camera. Using the physical dimensions of the one characteristic length, it may be possible to apply the methods and apparatus described herein to determine the trajectory of the object in 3-D. Thus, the method and apparatus is not limited to spherical objects. A few examples of non-spherical objects axis-symmetric objects are described with respect to FIGS. 8A, 8B and 8C.

In general, the method and apparatus described herein can be applied when a characteristic length associated with an object can be identified in image data from orientations relative to the camera in which the object is expected to appear. For example, knowing the shape and dimensions of a tennis racket or a paddle, it may be possible to identify in captured image data a characteristic length of the tennis racket, such as a diameter of the face, from most if not all of the orientations of the tennis racket relative to the camera. Based on the identified characteristic length, its size in the image data and its known physical dimensions, it may be possible its distance to the image capture device and place its location in 3-D physical space, as is discussed more detail below.

To determine a distance to a spherical object, a physical dimension of the object can be used. For example, for a basketball, its diameter measured in some length unit, can be used. In one embodiment, the type of ball, such as a men's ball or a women's ball, or the diameter of the ball can be input by a user. With the dimensions of the ball specified, a distance from the camera to the ball can be determined using 2-D image data. Using the determined distance from the camera to the ball, a determined position of the camera based upon accelerometer data and 2-D image data captured from the camera, a position of an object in 3-D physical space can be constructed.

In more detail, the images in which the basketball appears can be taken at different times where the time between images can be determined. Thus, the position of the basketball as a function of time in 3-D physical coordinates can be determined. Using the position of the ball as a function of time, other quantities can be derived, such as a 3-D velocity vector for the ball and a speed of the ball at different points along its trajectory based upon its change in position from image to image.

When a series of images is generated, such as via a video camera, all of images in the series don't have to be utilized. For example, if the video camera is recording images at 30 frames/sec and video is taken over some time period, all the frames, every other frame, every third frame, etc. can be utilized. Further, if an object of interest, such as a ball, is obscured an image or the ball can't be identified in a video frame, then the video frame may not be utilized.

In the image 100, basketballs are shown starting at a release height 118 above the court 114 and following along a trajectory up to the hoop 106. In general, the motion of a ball in 3-D at any time can be captured and characterized as long as it appears in the 2-D image data. For example, a motion of the ball can be characterized while a person is holding the basketball ball if it is at least partially visible in the captured 2-D image data.

In basketball, a person may hold the ball while driving to the basket or while catching a pass and then initiating a shot. The basketball may be only partially visible at times in the 2-D image data because parts of the ball can be obscured by a person's hand or body. Nevertheless, the system can be configured to recognize the ball in the image data and identify its position in view of its known circular appearance in the image data. In addition, the motion of ball can be characterized after striking the backboard or the rim, while it is being dribbled, while it is being passed or while it rolls along a surface, such as rolling around the rim or rolling on the ground. In general, a trajectory of ball can be determined while it is in flight, in contact with a surface or being carried in some manner.

If a ball is moving with a person, then a motion of a ball can also be used to characterize a motion of the person. For example, if a soccer player is dribbling a soccer ball near their feet, than the rate the ball is moving is similar to the rate the person is moving. Thus, the rate of movement of the person dribbling the soccer ball can be characterized. As another example, if a lacrosse player is running while holding the ball, then the velocity of the ball characterizes the velocity at which person is running.

In the examples above, the 3-D position and velocity of a ball in physical space can be determined using 2-D image data received from an image capture device, such as a camera, and knowing the size of the ball. When other secondary objects can be identified in the image data which have a known size, a distance of the camera to the secondary object and a 3-D position of the secondary object in physical space can be determined. With this information and position of the ball in 3-D physical space, a position of the ball relative to the secondary object can be determined.

As an example, in FIG. 1, the distance of the camera to the hoop 106 can be determined. If the hoop is standard hoop at a standard height, the hoop dimensions and the height of the hoop are known. Thus, a distance of the hoop to the camera can be determined and a position of the hoop in the same physical coordinate system as the ball can be determined. Then, a position of the ball relative to the hoop and other parameters, such as an entry angle of the ball as it approaches the hoop can be determined.

In other example, it may be possible to identify markings/boundaries on a court which have a known size and position, such as markings/boundaries on a basketball court, markings/boundaries on a tennis court or marking/boundaries on a bowling lane. Using this information, it may be possible to determine the coordinates of the basketball court, tennis court or bowling alley in 3-D physical space relative to the camera. Also, it may be possible to identify an object with known dimensions to provide additional position references. For example, a bowling pin, a base/home plate in baseball or a soccer goal in soccer, which each have known standard sizes, can be identified in 2-D image data and positions of these objects in a 3-D physical space defined relative to the camera can be determined. Then, a ball can be identified in 2-D image data from the camera and mapped to the same 3-D physical space which allows the position of the ball relative to the object to be determined.

The accuracy, with which a ball's trajectory is characterized, such as a basketball, can depend on the resolution of the camera, the distance of the camera from the object and any magnifying optics which are employed (e.g., a zoom lens). The ball will appear in a number of pixels where the number of pixels depends on the camera resolution and the distance of the camera from the ball. In general, as the number of pixels in which the ball appears increases, the ability to resolve the edges of the basketball and accurately determine its diameter in pixels increases. The accuracy of the diameter of the ball in pixels affects the accuracy at which the distance from the ball to the camera in physical space is determined.

In some embodiments, the ball may move a distance away from the camera during a series of frames such that the distance to the ball may no longer be accurately determined. For example, a smart phone camera used by a person sitting behind home plate of a baseball diamond may be able to determine a distance to the ball after it is hit for its entire trajectory if it is hit in the infield. However, if the ball is a homerun, as it approaches the outfield fence, it may not be possible to accurately track the distance to the ball. As another example, for smart phone camera behind a golf ball being hit off the tee, after the golf ball travels some distance, a camera resolution may not be able to accurately determine a distance to the golf ball.

In one embodiment, the system can be configured to cut-off tracking at some threshold value. For example, when the distance associated with a pixel divided by a diameter of the ball is above some percentage, such as 10% or 25%, the system may no longer attempt to track the trajectory of the ball and/or may indicate the trajectory data after some point in the trajectory where the threshold is surpassed is not accurate. For example, a trajectory of baseball which is determined can be output in green, yellow and red where green indicates sufficient accuracy, yellow indicates marginal accuracy and red indicates a relatively inaccurate calculation.

In another embodiment, the ball characterization methodology using 2-D image data can be combined with or enhanced by a predicted methodology. In particular, when the trajectory of an object can no longer be accurately determined using image data, the physical equations of motion for the object can be solved to extrapolate the 3-D trajectory of a ball determined using the 2-D image data. For example, a first portion of a home run shot or a golf shot in 3-D physical space can be determined using the 2-D image data, then a second portion can be estimated using a predictive methodology which solves the physical equations of motion for the object.

When the physical equations are solved, the initial conditions for the predictive methodology, such as an initial position of ball and a velocity vector for the ball in physical space can be supplied form the 3-D trajectory determined via the 2-D image data. For example, for a baseball trajectory, the predictive methodology can be applied after a ball leaves the infield where the initial conditions for the predictive methodology are the position and velocity of the ball as it leaves the infield. As another example, for a golf trajectory where the camera is placed near where the ball is hit, the predictive methodology can be applied after the ball has travelled some distance (e.g., 100 or 150 yards). In yet another example, for a golf trajectory where the camera is placed where the ball is hit, the predictive methodology can be applied starting at a point just before the ball becomes obscured by an object, such as passing behind trees or a hill which obscures a view of the ball.

In one embodiment, trajectories determined using the 2-D image data and a predictive methodology can be output in a side by side manner. For example, the initial conditions of a golf shot being hit can be determined from 2-D image data and the trajectory can be determined in 3-D using the 2-D image data. The predicted trajectory can be generated based upon the initial conditions near the ball being hit and the predicted trajectory can be plotted next to the actual 3-D trajectory determined from the image data.

In yet another embodiment, a number of trajectories can be generated from a single set of initial conditions. For example, for a hit baseball, which is a homerun, factors such as wind speed, temperature and ball spin can be varied through a range to predict a number of possible trajectories based upon 3-D initial conditions determined from the 2-D image data (e.g., the initial conditions may start after the ball has reach the outfield and 3-D trajectory determined from the 2-D image data becomes less accurate). These simulations can generate a landing ellipse in which the ball is predicted land. It is similar to a cone that is generated for predicting a path of a hurricane from a certain point. The landing ellipse can be used to provide a range of distances from home plate at which it is believed the homerun ball would have landed if it had not landed in the stands. Additional details of these predictive methodologies, which can be utilized herein, are described in is related to U.S. patent application Ser. No. 12/127,744, filed May 27, 2008, by Marty, et al, title, "Stereoscopic Image Capture with Performance Outcome Prediction in Sporting Environments," which is incorporated in its entirety and for all purposes.

FIG. 2 is a representation of a 2-D composite image 200 including a trajectory of baseball in flight in accordance with the described embodiments. A camera is positioned in front of an individual throwing the baseball. For example, the camera, which may be a smart phone, may be positioned behind a home plate and a catcher to which the person 202 is throwing. The person 202 in the image is shown in a position after releasing the baseball.

Baseball motions from other types of throws can be captured and characterized from 2-D image data, such as between players. In addition, motions of a hit ball can be characterized. Thus, the example of a person pitching is provided for the purposes of illustration only and is not meant to be limiting.

Unlike a basketball, which primarily travels in a parabolic/planar trajectory after release, a baseball's trajectory can be much more three dimensional. As a result of spin placed upon the ball, the ball may sink, rise or move side-to-side. Using the 2-D image data from the camera and a known size of the baseball a trajectory of the baseball in 3-D physical space can be determined.

In Figure w, the baseball is shown at a starting position 204, near its release, and an ending position 206, before it is caught. The baseball can be identified in a series of 2-D images. Then, as shown in FIG. 2, a line 210 can be drawn through the centers (e.g., 208) of the baseballs. Using the image data, the positions of the centers of the baseball can be determined in both 2-D pixel coordinates and 3-D physical coordinates.

The baseball appears to increase in size after it is released. The size increases because the baseball is getting closer to the camera. The initial size 204 of the baseball relative to the final size 206 is shown. In FIG. 2, the relative change in size is much greater than in FIG. 1 where the ball is moving more parallel to the camera.

Figure 3:
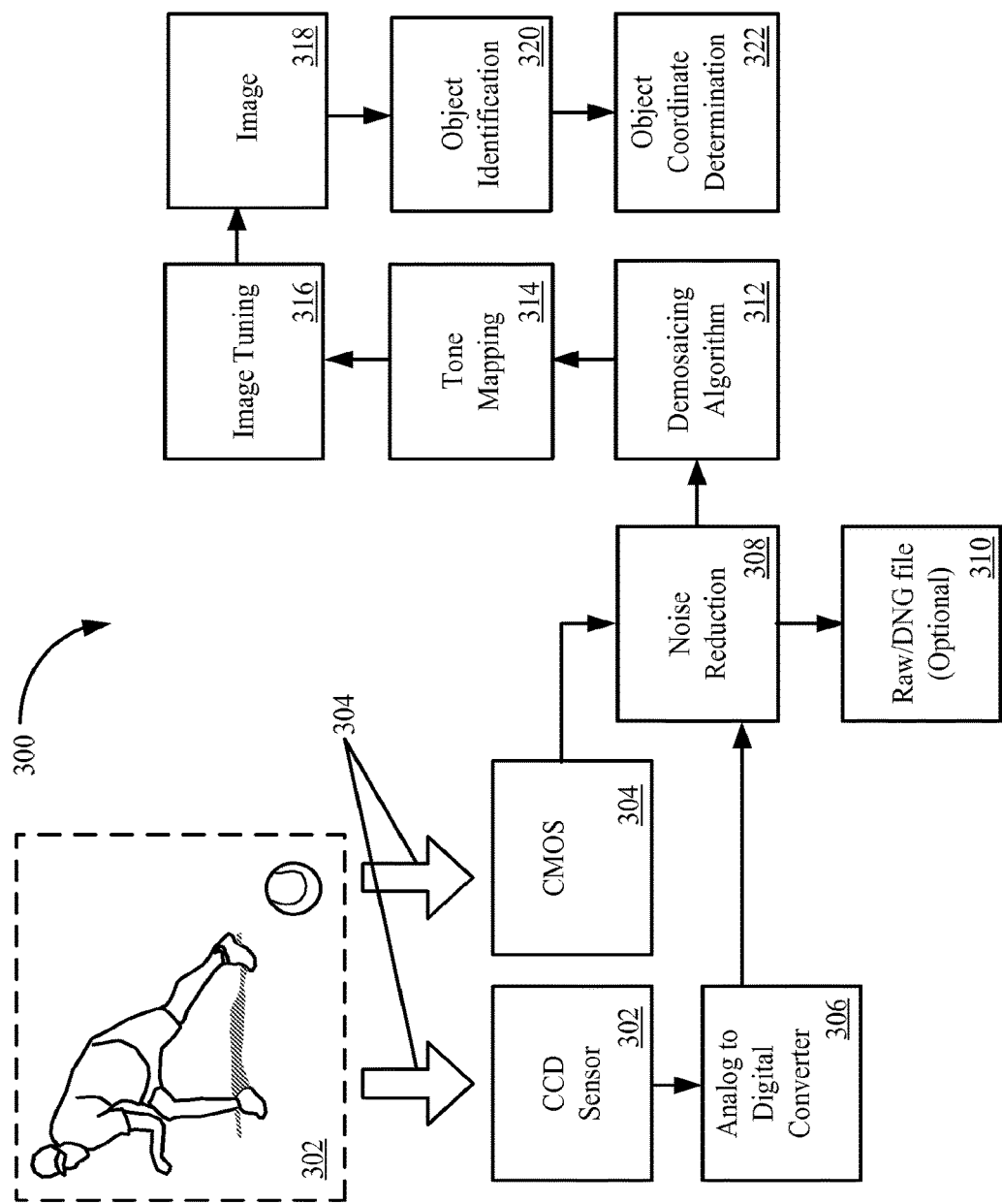
FIG. 3 is a system diagram including a 2-D digital camera in accordance with the described embodiments.

As described above, 2-D image data captured from a digital camera can be used to determine a three dimensional trajectory of a ball. Thus, some details of a digital camera are described as follows. FIG. 3 is a system diagram 300 of a digital camera which generates 2-D images in accordance with the described embodiments.

In FIG. 3, a field of view 302 of the camera which shows a person after having thrown a ball is shown. Light 304 from the field of view can pass through one or more lenses and then captured by a sensor. Typical, a digital camera will use one of a charge-coupled device (CCD) sensor 302 or a complementary metal oxides sensor (CMOS) 304. When light hits a CCD sensor 302 at a location, a current is generated. The current can be converted to a digital value using an analog digital converter, such as 306. In a CMOS 304, light hitting a sensor also generates a charge. However, an analog to digital converter is built into each pixel to convert the measured charge into a digital value.

Output from the CCD sensor 302 and Analog to digital converter 306 or the CMOS 304 can be array of digital values where each element in the array can be referred to as a pixel. Multiple values based upon color filtering can be generated for each pixel from the sensor. These values can be referred to as sensor counts.

The output from the sensor can have noise. Noise may result from defective pixels, such as "hot" pixels which are always on or "dead" pixels which record nothing. Other sources of noise are also possible. The noise reduction 308 attempts to reduce this noise. For example, dead pixels can be masked and a value can be determined as an average from surrounding pixels.

The output from the noise reduction 308 can be a Bayer pattern. The Bayer patterns include patterns of color resulting from a Bayer filter placed over the sensor. The Bayer patterns are assembled to create a color image. The Bayer patterns resemble a tile mosaic. In 312, the patterns are input to a demosaicing algorithm to form an RGB image.

Prior to demosaicing, the raw data can be stored in 310. One example of a file type is referred to as a digital negative (DNG) file. In some embodiments, the raw data can be processed in a manner that is beneficial to object recognition but not necessarily good for generating a recognizable RGB image. In various embodiments, object recognition can be applied to image data before and/or after demosaicing.

In 314, tone mapping can be applied. Tone mapping adjusts the perceived brightness of image pixels but doesn't change the color balance. Color balancing can be performed using a white point adjustment. Gamma correction can be performed to affect the perceived brightness of the image. Image tuning 316 can involve applying the different algorithms to affect the output of image, such as sharpening or blurring edges. The final image is output in 318 and can be stored.

Object identification 320 attempts to identify the ball including its dimensions and location in 2-D pixel coordinates. It can operate on the final image from 318 or data in a rawer format. For example, in some instances, special demosaicing algorithms can be applied to the raw data 310, which are beneficial for object recognition, such as edge detection.

Object identification 320 can also involve attempting to identify secondary objects, such as a hoop used in basketball, a pin in bowling, a net in tennis or a goal in soccer. If the type of sport is identified as input, then the system can be configured to look for particular objects associated with the sport, such as the hoop in basketball or a base/home plate in baseball. The object identification can involve utilizing known shapes associated with an object in a particular sport.

Object coordinate determination 322 can refer to determining the positions of a ball in true space (3-D physical coordinates) using the 2-D image data. In addition, the positions of secondary objects and the position of the ball relative to the secondary objects can also be determined. Details of one methodology for performing this determination are described as follows with respect to FIGS. 4A, 4B and 5.

Figure 4A:
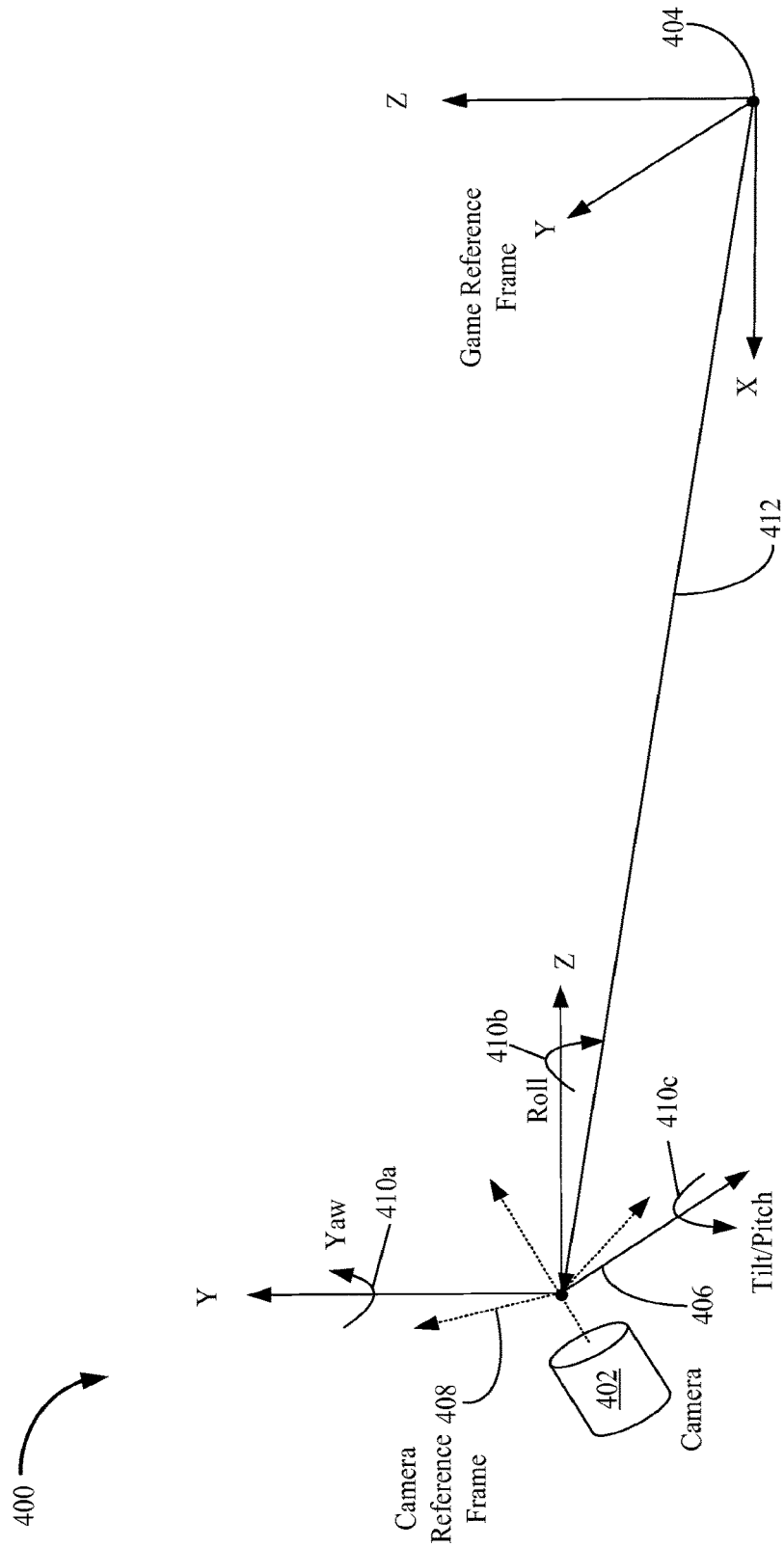
FIG. 4A is an illustration of a digital camera setup in accordance with the described embodiments.

FIG. 4A is an illustration of a digital camera setup 400 in accordance with the described embodiments. In FIG. 1, the game reference frame 404 can be relative to some surface, indoors or outdoors where a ball is being launched and tracked. For example, in 404, the X and Y directions can be in a horizontal plane which is a playing field for the sport, and the Z direction can be a distance above the horizontal plane. For example, the playing field can be an indoor or outdoor baseball diamond, basketball court or tennis court. Often the playing field is level, but in some instances, such as golf, the playing field can be some outdoor terrain, which can vary in height.

In one embodiment, a mobile computing device, such as a smart phone can be positioned to relative to the game reference frame. The smart phone can include a processor, a memory, a display, a network interface and a video camera configured to capture a series of video images including a time associated with each image. An application for performing the methods described herein can be downloaded to the phone from a remote code repository. The 2-D image data captured using the smart phone's camera can be used to generate trajectory information associated with a ball.

Information about trajectories and/or the 2-D image data can be output via the phone's display and/or other output mechanisms and/or uploaded to remote servers, such as a social media web-site, for sharing with other users and/or storage if desired. In addition, raw data used to generate the trajectory information can be stored on the phone or uploaded to remote servers. Further, the trajectory information can be combined with the 2-D image data. For example, a composite image as described above with respect to FIGS. 1 and 2 can be generated where a trajectory of the object is depicted.

In FIG. 4A, a camera reference frame 408 is shown. In the camera reference frame, one axis is aligned with a line perpendicular to the camera lens. Using an accelerometer on the phone, the camera reference frame 406 can be related to an Earth reference frame 406. The relationship between the camera frame and Earth reference frame is indicated as yaw 410$a$, roll 410$b$ and tilt/pitch 410$c$ values. Typically, at least 2 of the three of yaw, roll and pitch are available from a smart phone's accelerometer. A position vector 412 relating the Earth reference frame 406 to the game reference frame 404 is shown.

The combination of yaw-roll-tilt information from the smart phone accelerometers and the resolution information from the camera enables a board processor to relate the 2-D pixel arrangement in the camera field of view to the 3-D reference frame in the real world. In one embodiment, as referred to below as the camera accelerometer calibration, the 2-D pixel data for each picture can be translated to a reference frame as if the camera where resting on a horizontal plane perpendicular to an axis through the gravitational center of the earth where a line drawn through the center of lens perpendicular to the surface of lens is mapped to a center of the pixel data (e.g., see FIG. 4B). Since the ball is spherical, it appears the same (round in the image) if the camera is rotated around the axis through the gravitational center of the earth, i.e., the field of view is changed, as long as the object is in the picture. For non-spherical objects, this relationship doesn't hold.

Figure 4B:
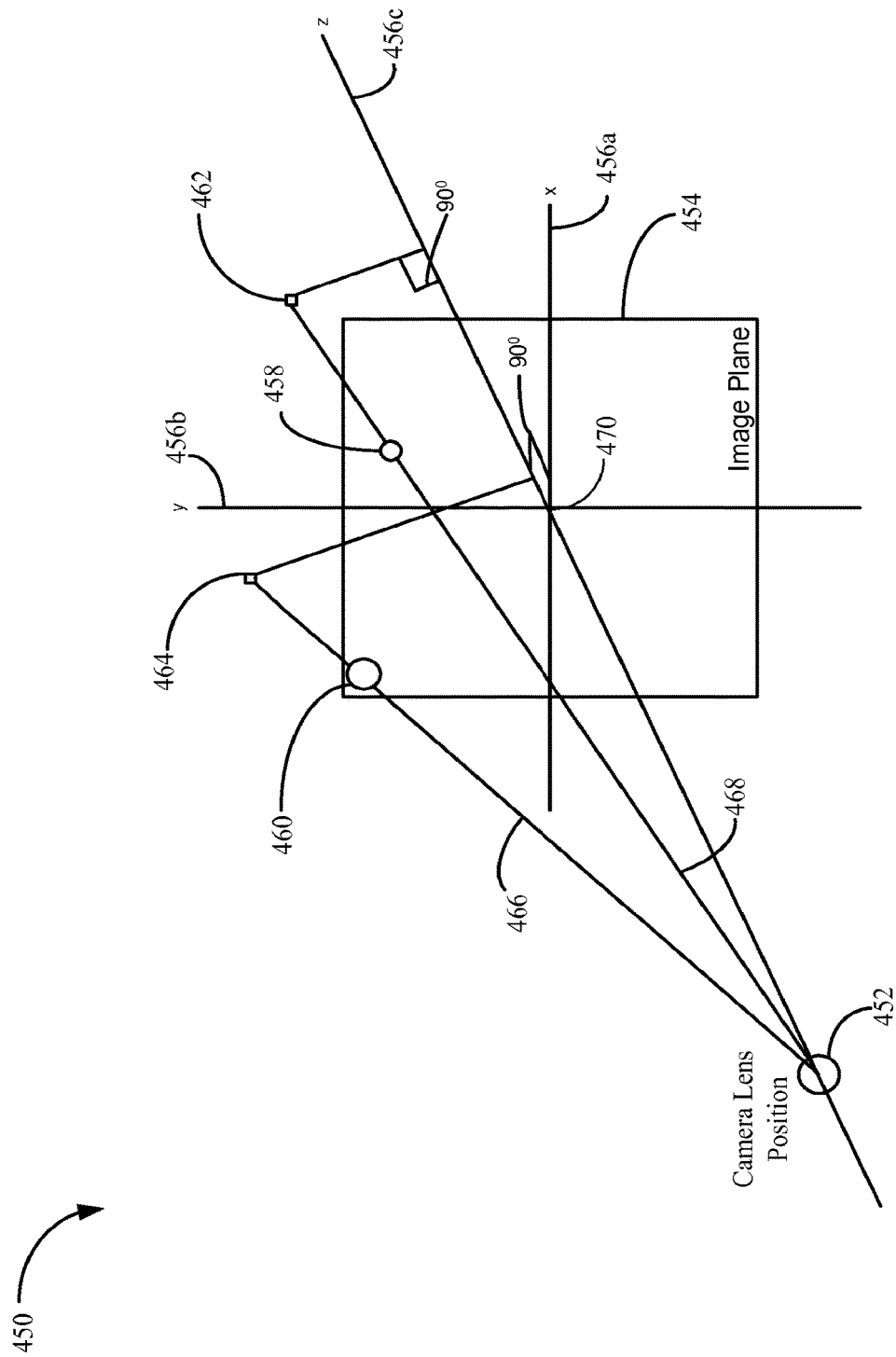
FIG. 4B is an illustration showing a 3-D object projected onto a 2-D image captured by a camera in accordance with the described embodiments.

FIG. 4B is an illustration 450 showing a 3-D object projected onto a 2-D image captured by a digital camera in accordance with the described embodiments. In 450, two images from a camera at a fixed position a camera are shown. The first image includes a first ball 460 and the second image includes a second ball 458. As described above, the 2-D image data is translated to a reference frame as if the camera is resting on a horizontal plane perpendicular to an axis through the gravitational center of the earth where a line 456$c$ is drawn through the center of the lens 452 is mapped to a center of the pixel data.

A ball, such as 460 and 458 can be identified in each 2-D image using object identification methods, such as edge detection. In one embodiment, the diameter in pixels which is measured is the diameter perpendicular to the flight line. This perpendicular diameter is usually the smallest diameter of the sphere since there can be motion smearing along the diameter parallel to the flight line. Occasionally, though, another diameter will be smaller due to light blooming. Light blooming is the result of scattering in the lens, which is interpreted as a bright spot in a scene. For example, a bright light in the background will appear to bleed over onto objects in the foreground.

In particular embodiments, multiple diameters of a ball identified in the pixel data can be determined in different directions and then averaged. The average value can be used in the distance determination. Besides the diameter, a center of the ball can be determined in pixel coordinates.

Based upon a known size of the ball and the number of pixels associated with a diameter of the ball, a physical distance of the ball to the camera can be determined. The position of balls 460 and 458 on the image data in physical space are indicated by spheres 464 and 462, respectively. A physical distance to the balls, 464 and 462, is indicated by the length of lines 466 and 468. Using the determined physical distance to the ball, pixel coordinates in the x, 456$a$, and y, 456$b$, and the angles from the indicated geometry, x, y coordinate values in the pixel plane can be converted to x, y coordinates in physical space. In addition, a physical distance perpendicular to the x, y plane in physical space along line 456$c$ can be determined. Thus, the position of the ball in 3-D physical space along its trajectory can be determined based upon its position in each of the 2-D images which are captured. Further, the location of the camera (center of the lens) in the same reference frame can be also be determined as shown in FIG. 4A.

For each of a series of 2-D images, the x, y, z position of the ball in physical space can be determined. The time at which image is generated is generally known for each image. Typically, a camera provides a time stamp for each image. Further, for a video camera, the frame rate, which is usually expressed as video frames captured per second is a known quantity for a camera. With this information, the x, y, z position of the ball in physical space as a function of time can be determined.

With the x, y, z position of the ball known as a function of time determined, a velocity and an acceleration of the object in each direction can be generated at each time by determining the appropriate derivatives. Then, information related to position, direction, velocity and acceleration at one or more positions of the ball captured in the image data can be output to the user immediately or at some later time. For example, for a baseball pitch, a trajectory of the baseball can be output to a display device on the camera device, a speed associated with the pitch can be output to the display or in audio format. Further, if the position of the plate has been determined in 3-D space, it may be possible to determine a position of the ball relative to the plate.

Additional details of two methods for determining a 3-D trajectory of a ball using 2-D image data are described as follows with respect to FIGS. 5-8. Prior to determining a 3-D trajectory, a number of calibration steps can be performed which can be used for one or both methods are described. The calibration steps are described with respect to FIG. 5. Then, a first method of determining the 3-D trajectory of a ball is described with respect to FIG. 6 and a second method of determining the 3-D trajectory of a ball is described with respect to FIGS. 7 and 8.

Figure 5:
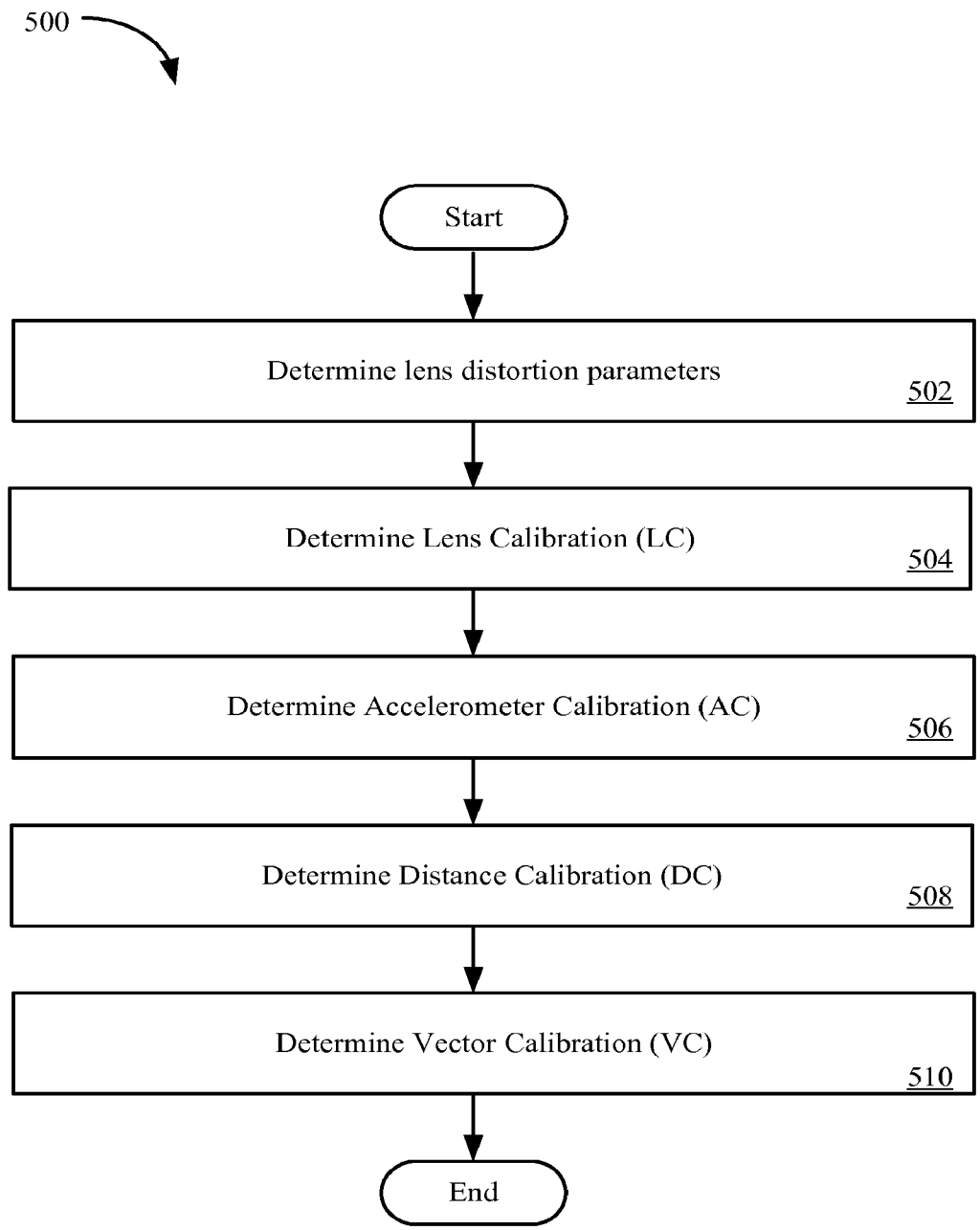
FIG. 5 is a flow chart 502 including one or more calibration steps which can be used to determine a trajectory of an axisymmetric in 3-D physical space using 2-D image data.

FIG. 5 is a flow chart 502 including one or more calibration steps which can be used to determine a trajectory of an object with an identifiable characteristic length, such as an axisymmetric object, in 3-D physical space using 2-D image data. In 502, lens distortion parameters can be determined. When a checker board pattern of equally sized squares is held up to the camera, an image with equally sized squares is not always generated as a result of lens aberrations. For example, some of the squares can be distorted and of different sizes than one another. In 502, lens distortion parameters can be determined. In 504, a lens calibration can be developed which adjusts the pixel sizes in the 2-D image data such that a 2-D image of a pattern of squares of equal sizes is reproduced in the 2-D image data. This calibration can be applied each time a 2-D image is captured.

In 506, the acceleration calibration can determined based upon accelerometer data associated with the position of the camera (i.e., the position of the mobile computing device which includes the camera). As described above, the pixel data for each captured image can be translated to a reference frame as if the camera where resting on a horizontal plane perpendicular to an axis through the gravitational center of the earth where a line drawn through the center of lens perpendicular to the surface of lens is mapped to a center of the pixel data (e.g., see FIG. 4B). The accelerometer calibration can be applied to the pixels in each of the 2-D images which are analyzed.

When the position of the camera is fixed, the accelerometer calibration is essentially the same for each captured 2-D image. In one embodiment, it may be possible to receive accelerometer data and match it on a frame by frame basis to each 2-D image. When a camera is being held and slightly moving, the accelerometer calibration can be determined on a frame by frame basis using the received accelerometer data. Thus, it may be possible to generate a 3-D trajectory for a ball from images obtained from a video camera which is held and moving to some degree as opposed to being fixed in a position relative to a surface. If a stationary object of a known size is present in each of the 2-D images, such as a basketball hoop, it may be possible to continually determine the orientation and distance of the camera to the object and thus, construct a 3-D trajectory of ball from 2-D video images taken from a moving digital camera.

In 508, a distance calibration can be determined. Based upon a known size of an object and a resolution of the video camera, tables, which relate a determined pixel length of the diameter of a ball or some characteristic length of a ball, to a distance to the ball from the camera can be generated. For example, for a baseball captured in a 2-D image by a camera of a specified resolution, a physical distance to the ball from the camera can be determined from the table by specifying the diameter of the ball in pixels which is detected in the image. In other embodiments, the determination of the physical distance of the ball to the camera can be done on the fly without using the distance calibration. In some embodiments, a user can select a resolution of images to be captured and then a selected resolution can be provided as input.

In 510, direction calibration values can be determined. As described above, the 2-D image data can be transformed such that it corresponds to a camera aligned with a center of the 2-D image data (i.e., as if the image data is generated by a camera lens parallel to the 2-D image plane where a line passing through the center of the 2-D image data passes through and is perpendicular to a center of the camera lens.) An angle can be defined between a first line drawn through a center of the image data and center of the camera lens and a second line drawn from the center of the camera lens to a pixel location on the 2-D image plane (see FIG. 4B). The value of the angle at each point in the pixel array depends on the distance from the camera lens to the ball. Once the distance between the ball and the camera is determined, the angle is determined.

In 510, tables can be generated which relate physical distance to angle for a number of different distances. Thus, if a distance and pixel coordinates are specified, the angle at the pixel coordinate can be looked up from the table. Interpolation and extrapolation schemes can be utilized when the angles for a particular distance have not been stored to the table, such as linear or higher order extrapolation. Once the angle is known, the position of the ball in 3-D physical space can be specified. As described above for the accelerometer calibration and the distance calibration, the angle determination can be done on the fly without the use of a lookup table. However, the use of a lookup table may reduce a time needed to determine a 3-D trajectory of a ball.

Figure 6:
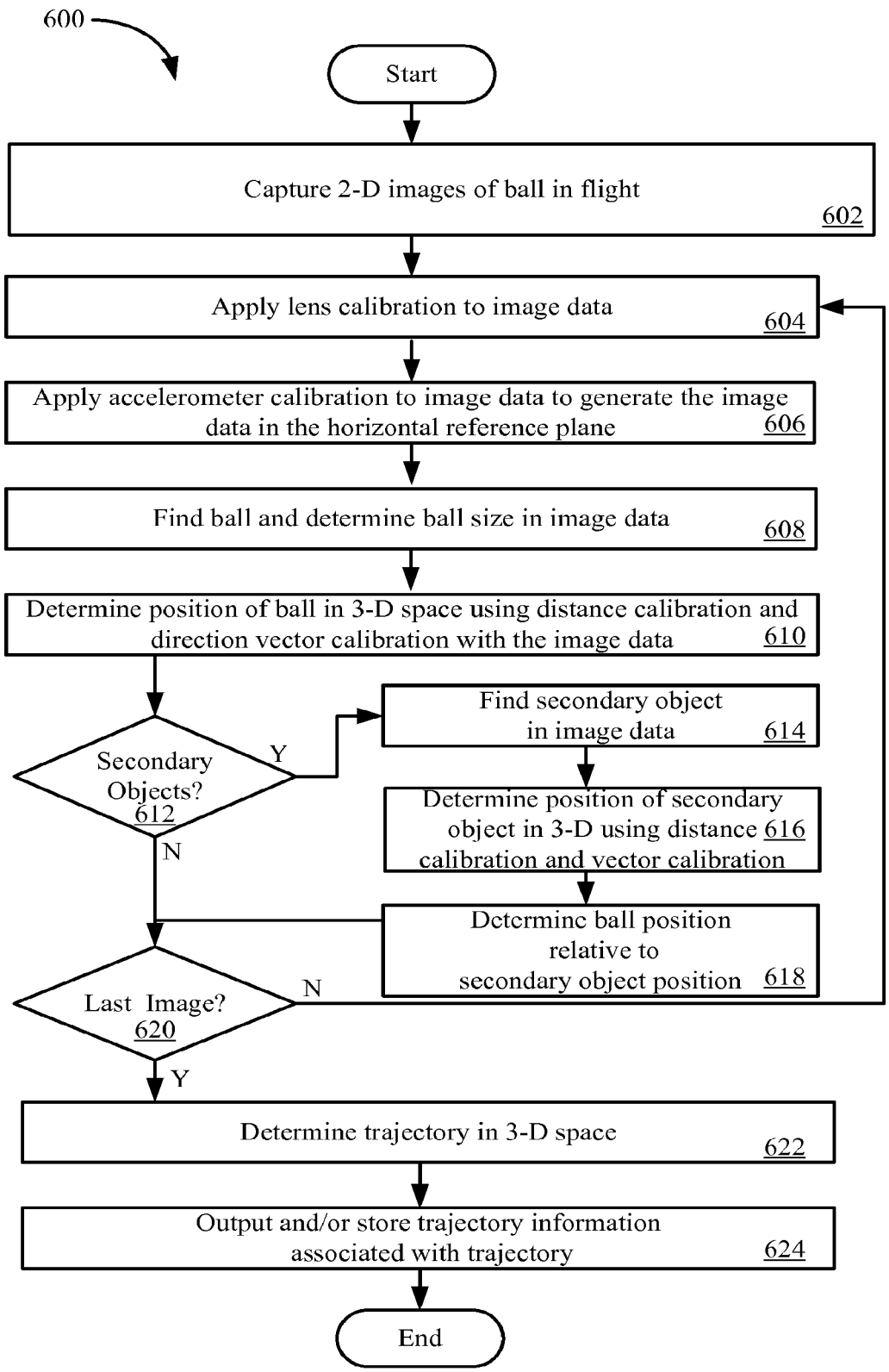
FIG. 6 is a flow chart of a method for determining a 3-D trajectory of a spherical object using 2-D image data in accordance with the described embodiments.

Next details of a first method for determining a 3-D trajectory of a ball from 2-D image data is described. FIG. 6 is a flow chart of a method 600 for determining a 3-D trajectory of a spherical object using 2-D image data in accordance with the described embodiments. In 602, 2-D images of ball in flight and/or rolling along a surface (e.g., a golf ball rolling along the ground, a basketball rolling around a basketball hoop or a bowling ball rolling down a bowling lane) can be captured. Further, 2-D images of a ball in contact with a surface can be captured, such as a ball being held/moved by a body part of a person (e.g., held/moved by a hand or foot), being struck by an object (e.g., a racquet held or a bat held by a person) or striking and bouncing off a surface (e.g., a basketball hoop or a playing surface). A single trajectory can include multiple components, such as a ball being held, in flight and rolling along a surface, during its trajectory.

In 604, a lens calibration, as described above, with respect to FIG. 5, can be applied to first image data in a series of captured 2-D images. In 606, the accelerometer calibration can be applied to the first image data. The accelerometer calibration, described above with respect to FIG. 5, accounts for one or more of yaw, roll, and tilt/pitch of the camera and transforms the first image data to a reference frame as if the camera is resting on a horizontal plane perpendicular to an axis through the gravitational center of the earth where a line drawn through the center of lens perpendicular to the surface of lens is mapped to a center of the pixel data. Other reference frames can be utilized and this one is provided for the purposes of illustration only and is not meant to be limiting.

In 608, using object recognition methods applied to pixel data, such as edge detection methods, a ball can be located in the first image data and a diameter of the ball in pixels can be determined. In some embodiments, the diameter of the ball in pixels can be determined in one or more directions. When the diameter is determined in multiple directions, in some embodiments, the multiple diameters can be averaged in some manner. In a particular embodiment, the determined number of pixels of the diameter is below a threshold value, the system may not determine a distance to the object because of the error margin associated with the calculation. The threshold value may depend on a resolution of the camera which is being utilized.

In 610, a position of the ball in 3-D physical space can be determined using the distance calibration and direction vector calibration with the first image data. As described above, the distance calibration can relate the diameter of the ball in pixels to a distance to the ball from the camera. The direction vector calibration can be used to determine one or more angles associated with the distance to the ball from the camera. In one embodiment, distance calibration value and direction vector calibration values can be determined using a table lookup procedure. In another embodiment, the distance calibration values and direction vector calibration values can be determined on the fly.

In 612, the system may attempt to locate one or more secondary objects. The identification of secondary objects is optional. In one embodiment, the type of ball and/or whether it is being played on a marked field using standard equipment can be input into the system. For example, the system can receive input that a women's basketball is being used on a marked basketball hoop with a standard hoop height and standard hoop. Based upon this information, the system can be configured to attempt to locate one or more, such as the hoop and/or one or more court markings in the first image data.

As another example, the system can receive an input that the ball is a standard baseball and a game is being played on a little league baseball diamond. Based upon this information, the system can be configured to attempt to locate one or more bases and construct positions of a little league baseball diamond relative to the camera in 3-D space using known dimensions of a little league baseball diamond. Then, the trajectory of thrown or hit balls can be determined and placed relative to the baseball diamond.

In one embodiment, the system can be configured to allow a user to identify dimensions for a size of a non-standard object. For example, the system can be configured to allow a user to receive an input of a size of a non-standard soccer goal. In one embodiment, the user can take a picture of an object, trace its outline and then enter its dimensions or identify it some manner. For example, a picture including soccer goal can be taken and the system can output an image of the goal to a touchscreen display. Then, the user can trace over a portion of the object and/or draw a shape around the object. The received touch input can be used by the system to identify the object in the image and other related images.

As another example, the system can output an image of a tennis court and the user can trace over court lines or a top of a net on the tennis court. For example, the system can be configured to prompt the user to trace over the top of the net or identify it some other manner in the image. The system can receive this input and use it to help identify the net in the output image and other images.

As described above, the system can use the information received from the touch screen to attempt to identify the object of interest highlighted by the user. Then, in one embodiment, the system can request dimensions from the user for one or more portions of the object. The dimension information can allow the system to determine a distance to the secondary object using the 2-D image data. In addition, the system can be configured to identify the secondary object in subsequent images. In one embodiment, object identification of secondary objects can be performed as part of a calibration procedure described above with respect to FIG. 5.

In 614, the system can attempt to identify the secondary object in the image. Then, a length of some portion of the object with a known length in physical space can be determined in pixels. If an object has been identified in a previous 2-D image in a series of images and the object is stationary and the camera is stationary, the system may attempt to look for the object in approximately the same location at which it has been previously identified.

Further, if a secondary object can't be identified because it is obscured in one of the images, the system can be configured to assume the secondary object is at its previously detected location. For example, a camera view of a secondary object, such as soccer goal or a base in baseball can be obscured by the presence of a person between the camera and the object, such a person standing on the base or in front of the goal, in one of a series of images including the object. However, based upon an identification of the object, in one of the other images in the series, the object can be assumed to be at the same location in the image.

In one embodiment, a stationary object may only be identified once in a series of images and then assumed to be in the same location for the rest of the images. For example, a position of a basketball hoop can be identified once and as long as the position of the camera is not changed as indicated by the accelerometer data, the system can configured to assume the position of the basketball hoop has not changed and is the same in subsequent images. When the system, determines the position of the camera is adjusted, such as via a change in the accelerometer data, the system can be configured to attempt to re-identify the object in the image data.

In one embodiment, a camera can be held such that the position of the camera is changing over time in a series of images. In this case, the system can be configured to attempt to identify a secondary object, such as a basketball hoop in each of the images. The basketball hoop can provide a reference point with a known fixed position and physical dimensions and then the trajectory of the basketball can be placed relative to the basketball hoop in each of the series of images even though the camera may move from image to image.

In 616, using the distance calibration and direction vector calibration, a distance to one or more portions of the object can be determined in physical space. In 618, if desired, a position of the ball relative to the secondary object can be determined, such as an angle at which a basketball approaches a hoop or a location within in a goal at which a soccer ball crosses the plane of the ball.

In 612, when there are no additional secondary objects to be located, the system can determine in 620, whether there are additional images to be processed. When there are additional images to be processed in a sequence of images, the method can return to 606. When there are no additional images, in 622, the trajectory in 3-D space can be constructed. In one embodiment, as described above, analytical predictive methods can be used to determine portions of the trajectory. For example, physical equations of motion can be solved based upon initial conditions determined from the trajectory determined from the 2-D image data to extrapolate a 3-D trajectory beyond where the trajectory can be accurately determined using the 2-D image data.

In 624, information associated with the determined 3-D trajectory can be output. For example, an image, such as shown in FIGS. 1 and 2, including one or more of the 3-D trajectories which have been generated and/or portions of the 2-D images used to generate the trajectory (e.g., one or more fixed objects from the images) can be output to a display device. In addition, additional features can be added to output images that are not necessarily captured in the images used to generate the 3-D trajectory. For example, if a portion of a tennis court including a tennis ball trajectory is captured, the system can be configured to render in an image of an entire tennis court including markings and place the captured 3-D trajectory to scale on the rendered tennis court using the portion of the tennis court captured in the image.

As another example, if a portion of a baseball field is captured and a 3-D trajectory of a baseball is determined relative to the baseball field, then an image including the 3-D trajectory an the entire baseball field can be rendered and output. In yet another example, a 3-D baseball trajectory determined on one field can be displayed on another baseball field. For example, a 3-D homerun trajectory captured on one major league field can be rendered relative to another major league field to determine whether it would still be a homerun on the other field.

In one embodiment, an interactive interface associated with the 3-D trajectory can be generated. The interactive interface can be configured to allow a user to manipulate the trajectory, such as rotate it in space to allow it be viewed from different angles and see details about the trajectory, such as velocities, accelerations and positions at different points along the trajectory. For example, the speed of a baseball pitch at release or when it is crossing the plate can be determined and output to a user.

Information about a 3-D trajectory and data used to generate the 3-D trajectory, such as 2-D image data can be stored to the mobile computing device, such as a smartphone. It can also be uploaded to a remote server. Further, in some instances, it can be shared with other individuals or posted to a social media site.

In one embodiment, statistical variations associated with a number of trajectories and/or motions, such as body motions, captured in the 2-D image data, can be determined. The statistical variations can be used to generate consistency parameters which measure how consistently a trajectory or a body motion is repeatedly generated. In one embodiment, the motion consistency parameters can be used as part of a video game and/or as a basis for generating a training regimen for improving consistency of motion. Details of generating and using consistency parameters are described in U.S. patent application Ser. No. 13/780,970, filed Feb. 28, 2013, by Marty, et al., which is incorporated by reference in its entirety and for all purposes.

Additional Trajectory Determination Methods

As described in this section, other methods involving the use of 2-D image data can be used in addition to or separate from ball size determination to determine a position or an orientation of a ball in 3-D space as a function of time. As is described below, these methods might not be applicable under all conditions or for all objects. In one embodiment, certain methods can be applied to parabolic and planar trajectories.

If forces, such as drag, lift, spin and wind, are minimal, an object, such as a spherical object, may follow a parabolic and planar trajectory. For example, a basketball indoors or outdoors without wind essentially follows a parabolic and planar trajectory. As another example, a shot put essential follows a planar and parabolic trajectory.

Figure 7:
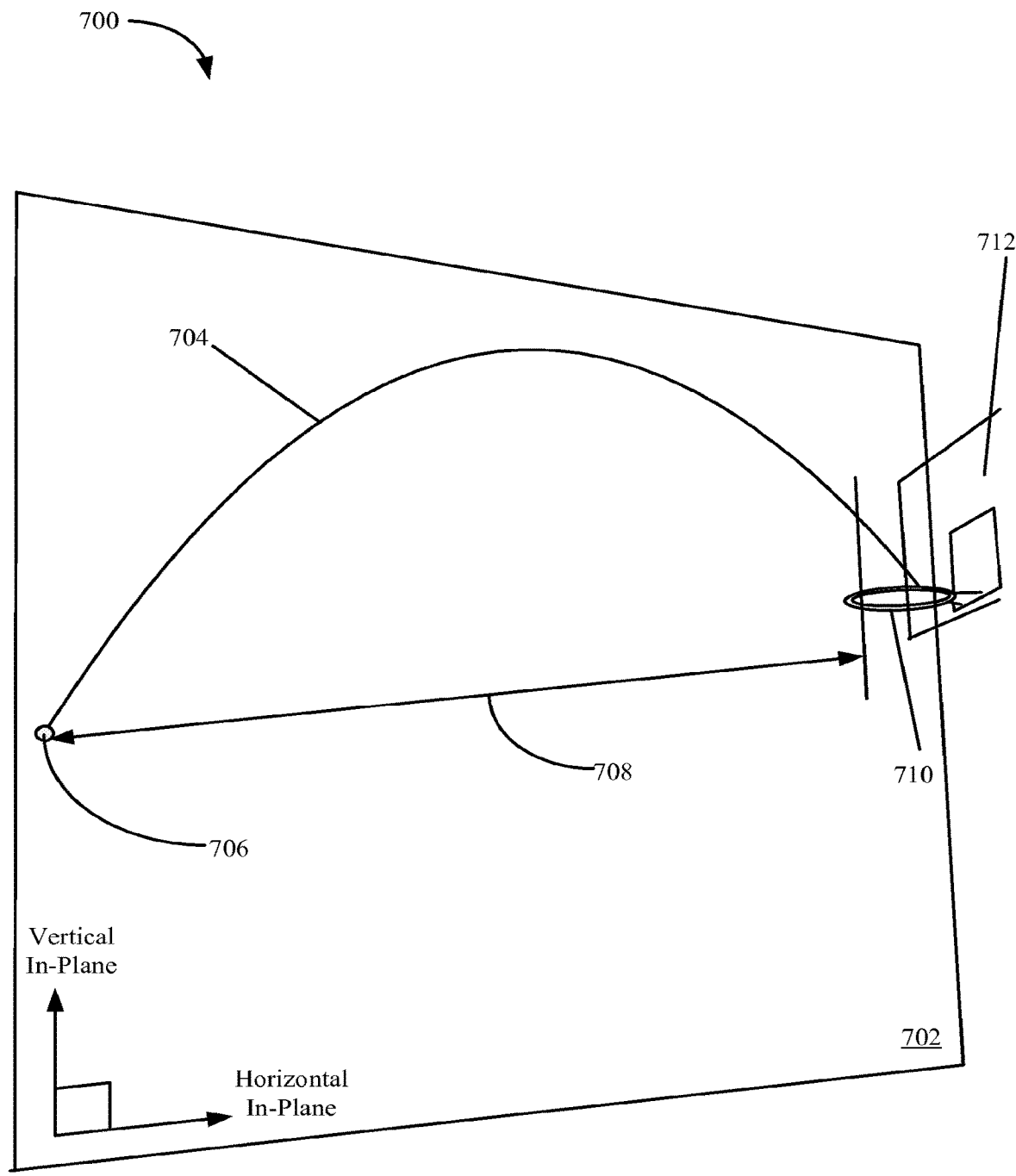
FIG. 7 is an illustration of a parabolic trajectory and planar trajectory in accordance with the described embodiments.

FIG. 7 is an illustration of a 2-D image of a parabolic and planar trajectory 704 for a basketball, which travels to hoop 710 in plane 702. The hoop 710 is mounted to a backboard 712. The start of the trajectory is point 706 (release point). After the release, the basketball travels in plane 702 with a vertical in-plane velocity and horizontal in-plane velocity, which vary as a function of time.

In one embodiment, a distance and orientation of an image capture device can be determined without using ball size. For example, a distance of the image capture device to a basketball hoop, can be determined from identifying the hoop and determining its diameter in pixels. With a physical diameter of the hoop known, the physical distance of the camera to the hoop can be determined. For a standard hoop, the height of the hoop is also known.

Depending how the shape of the hoop appears in the image, an orientation of the image capture device relative to the hoop including its height above the ground can be determined. For example, if the camera is at the same height as the hoop, the hoop will appear as a line. The hoop is assumed to be in a plane parallel to the ground. If the camera lens is resting on a plane parallel to the ground, the hoop will appear level in the image. Else, the hoop will appear tilted in the image. Thus, the orientation of the hoop in image can be used to determine an orientation of the camera. In one embodiment, the determined orientation of the image capture device relative to the hoop can be used to normalize the image data relative to the ground (Earth reference frame) as was described above.

In alternate embodiments, the orientation of the horizontal and vertical lines on the backboard 712 or the side and top edges of the backboard in the image data can be used to determine an orientation of the camera relative to the backboard. Further, an orientation of the hoop relative to these lines or edges, alone or in combination, with a distance to the backboard, can be used to determine an orientation of the camera relative to the hoop and backboard. Again, when the orientation and/or position of the camera are determined, it can be used to normalize the 2-D image data.

In other sports, the appearance fixed objects with known dimensions can be used to determine a position and orientation of a camera relative to the object. For example, the appearance of football goal posts of known dimensions in an image can be used to determine an orientation of the camera and a distance of the camera to the goal posts. As another example, the appearance of a soccer goal of known dimensions can be used to determine a position and orientation of the camera relative to the goal.

In the example above of trajectory 704, the position of the center of the hoop in 3-D space relative to the camera can be determined. If it is assumed the trajectory of the ball passes through the hoop, then the position of the center of the hoop can be approximated as a point along trajectory 704. The location of point 706 might be partially determined by knowing a release height of the shot. Most good shooters, such as NBA players, release the ball at a consistent height. Thus, if the shooter is identified, the height of point 706 can be assumed to be the release height.

A position of a person on a court might be determined by identifying court markings and a person's foot position relative to the court markings can be used to determine a 3-D position of point 706 in 3-D space. If a time it takes a ball to travel from point 706 to the center of the hoop can be determined, a velocity of the ball in the horizontal in-plane direction can be determined, since distance 708 is known. In one embodiment, the time can be determined from the time between when images are captured. In the horizontal in-plane direction, the distance the ball travels per time is constant. Thus, knowing the horizontal in plane velocity can be used to determine a physical position of the ball in the plane 702.

In the vertical in-plane direction, knowing that the ball rises and falls according to the Earth's gravity, y position in physical space can be determined which generates a trajectory 704 as it appears in the image data. In particular, different trajectories can be generated and projected onto the 2-D image until the trajectory matches the one in the 2-D image. Knowing the orientation of plane 702 from the position of the center of the basket and the position of the release point 706, or in general any two points which can be determined to be located in plane 702, position as a function of time along trajectory 704 in plane 702 (or in 3-D) can be estimated and properties of the trajectory can be determined.

Non-Spherical Objects

Figure 8A:
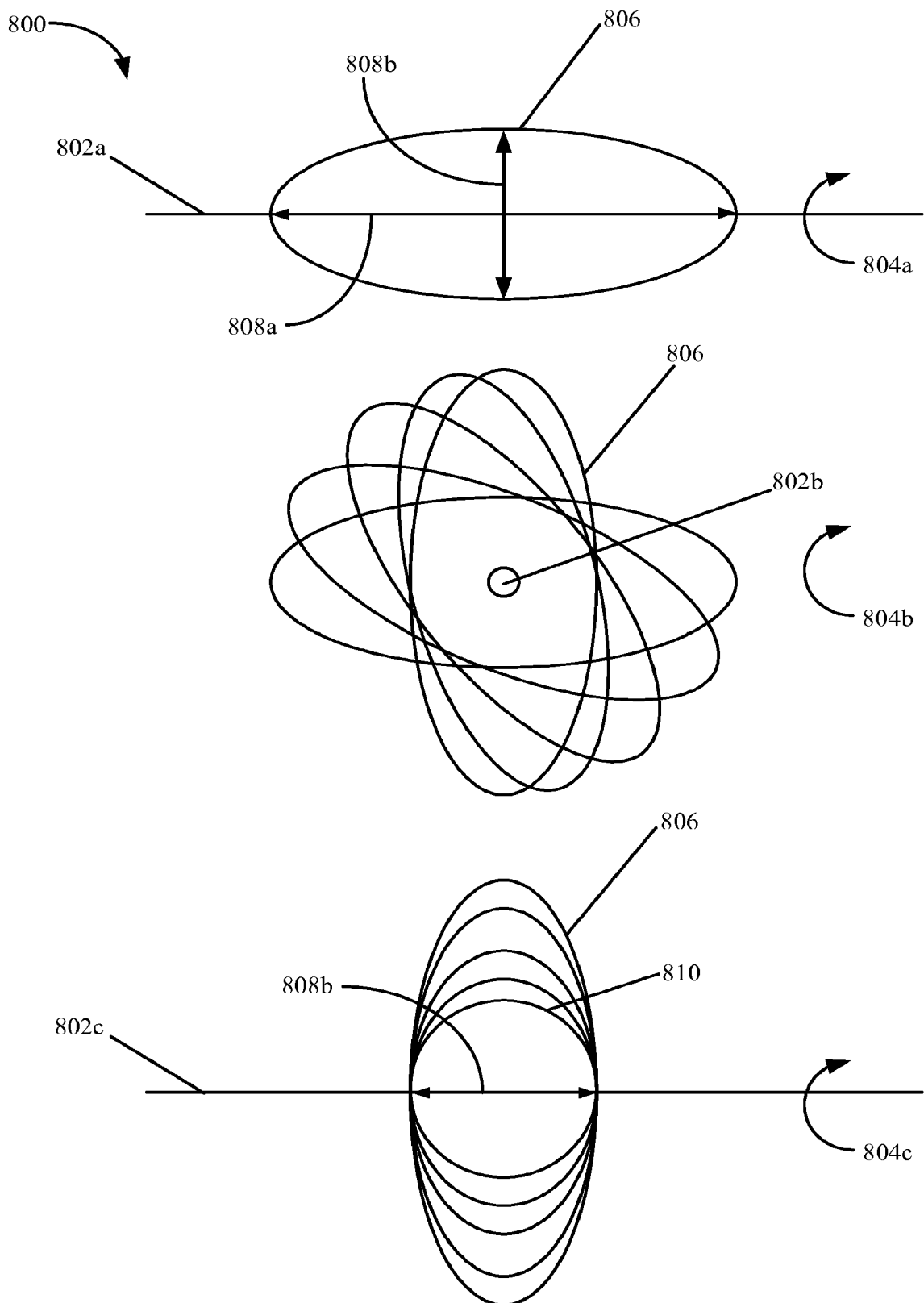
FIG. 8A is an illustration of a prolate spheroid shaped object in various orientations in accordance with the described embodiments.

In this section, position determination for non-spherical objects using 2-D image data is described. FIG. 8A is an illustration of a prolate spheroid shaped object in various orientations 800. A prolate spheroid is a spheroid in which the polar axis is greater than the equatorial diameter. Prolate spheroids are elongated along a line, whereas oblate spheroids are contracted. An American football, a rugby ball and an Australian rules football are approximately prolate spheroids.

In FIG. 8A, a cross section of the spheroid is ellipse 806. The ellipse 806 has a major axis 808a and a minor axis 808b. The cross section in different orientations can be used to determine how the object will appear in 2-D image data taken by a camera.

A rotation 804a around axis 802a of the spheroid doesn't change the cross section in 2-D because the spheroid is symmetric around axis 804a. A rotation 804b of spheroid around axis 802b, which is through the center of the ellipse changes an orientation of the elliptical cross section 806. A rotation 804c of the spheroid around axis 802c causes the cross section to vary from elliptical cross section 806 to circular cross section 810. Depending on the amount of rotation around axis 802c, the cross section can appear as an ellipse of a varying size with a major axis which varies in size between the diameter of circle 810 and the length of the major axis of ellipse 806.

The cross sections associated with the various orientations 800 span how the object can approximately appear in a 2-D image. In any of the orientations, the edge of the spheroid appears as an ellipse. For any orientation and shape of the ellipses, the minor axis 808b is always the same length where a circle is an ellipse where the major axis and minor axis are the same length. Therefore, if the length of the minor axis can be identified in the image data and the physical length of the minor axis is known, the physical distance from the camera to the object can be determined from the image data as was described above.

Further, the ratio of the length of the major axis to the length minor axis can provide some information about the orientation of the object relative to the camera. For example, when the ratio is one, the spheroid is being positioned end-on to the camera, i.e., the circular cross section appears in the image data. When the ratio is a maximum value, the spheroid is being viewed from the side where it has its maximum area cross section. The orientation determination is not definite because multiple orientations can appear the same in the 2-D image data. For example, a football viewed end-on can look the same independent of which end is pointing towards the camera. As another example, a ball rotated through an angle around an axis in one direction can appear the same when it rotated through the same angle in the opposite direction.

In general, for any object with a variable position that has a characteristic length that can be identified in 2-D image data for some set of orientations relative to a camera that are of interest, the distance of the camera to the object can be determined in physical space when the physical length of the characteristic length is known. In the case of a sphere, the characteristic length that can be identified is the diameter of the sphere. In the case of a football, the characteristic length is a minor axis of its elliptical cross section. In the case of a hoop, the characteristic length is the diameter of the hoop.

For the case of sphere, football or hoop, it is possible and/or desirable to identify the characteristic length of the objects in 2-D image data for any orientation of the camera relative to the object because depending on the trajectory parameters the object can appear. For other objects, it may not be necessary to identify the object from any orientation. For instance, if the object is limited to a set of orientations during play, then it may not be necessary to identify the characteristic length from for the object from all orientations.

Figure 8B:
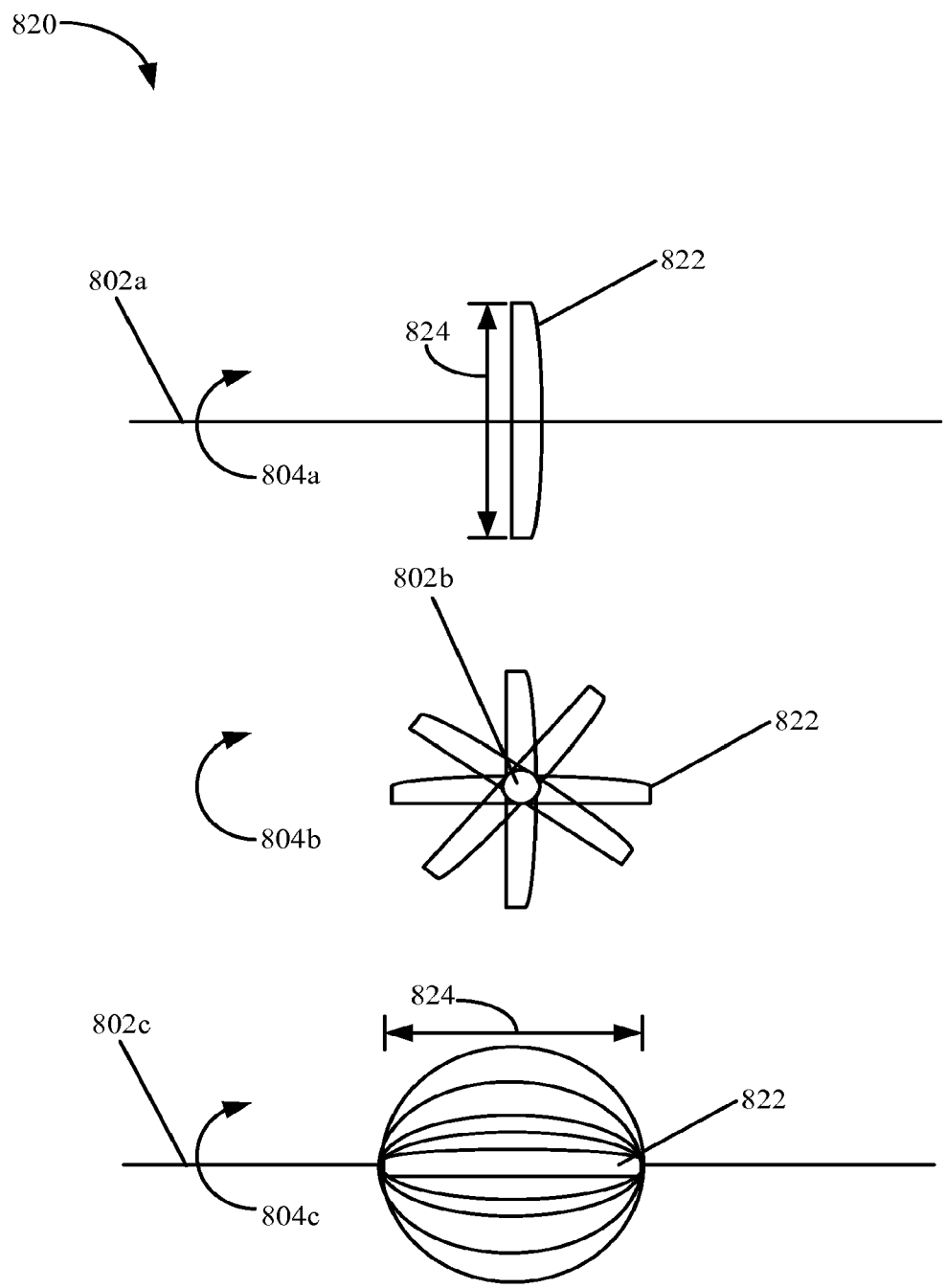
FIG. 8B is an illustration of a Frisbee shaped object in various orientations in accordance with the described embodiments.

FIG. 8B is an illustration of a Frisbee shaped object in various orientations 820. An edge-on cross section 822 has a diameter 824. The diameter 824 can be considered the characteristic length. A rotation 804a of the Frisbee around axis 802a doesn't change the shape the cross section 822 which is viewed because the object is symmetric about this axis. A rotation 804b of the cross section 822 around axis 802b changes the orientation of the cross section but not its shape. A rotation 804c around axis 802c causes the Frisbee to appear edge-on with cross section 822 to an ellipse with major axis 824 up to a circle with diameter 824.

Thus, if cross section 822 can be identified in the 2-D image data or one of the ellipses with major axis 824 can be identified in the 2-D image data and the characteristic length 824 can be determined, the physical distance to the object to the camera can be determined when the physical length of the major axis is known. Knowing the physical distance to the object and the orientation of the camera, as described above, the position of the object in 3-D space can be determined. Knowing the position as a function of time, such as from the times when the images were captured, trajectory parameters, such as a velocity vector, can be determined at various positions along the trajectory.

Figure 8C:
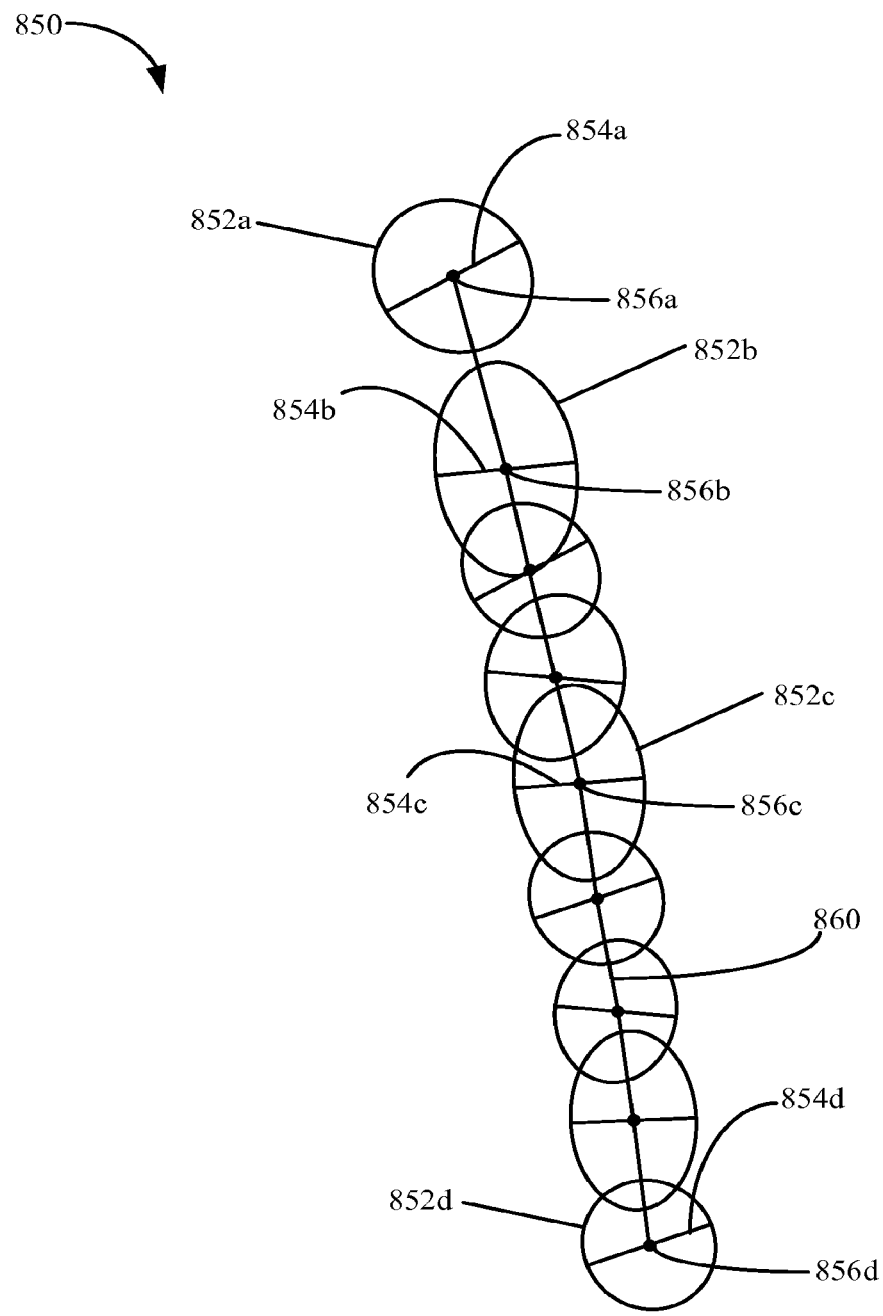
FIG. 8C is a representation of a 2-D composite image including a trajectory of a football in flight in accordance with the described embodiments.

FIG. 8C is a representation of a 2-D composite image 850 including a trajectory 860 of a football in flight. To the camera, the outlines of the football appear approximately as ellipses of different sizes and different orientations, such as 852a, 852b, 852c and 852b. For each ellipse, a center of the ellipses, such as 856a, 856b, 856c and 856d, can be determined. Further, a minor axis of the ellipses, such as 854*a*, 854*b*, 854*c* and 854*d*, can be determined. The distance to the football to the camera can be determined when the equatorial diameter of the football is known. The 3-D position of the football at each position can be determined using the methods described above, such as with respect to FIGS. 5 and 6. When the points are determined, the points can be connected to generate a trajectory, such as trajectory 860. When the points are known as a function of time, parameters, such as velocity, can be determined.

System

Figure 9:
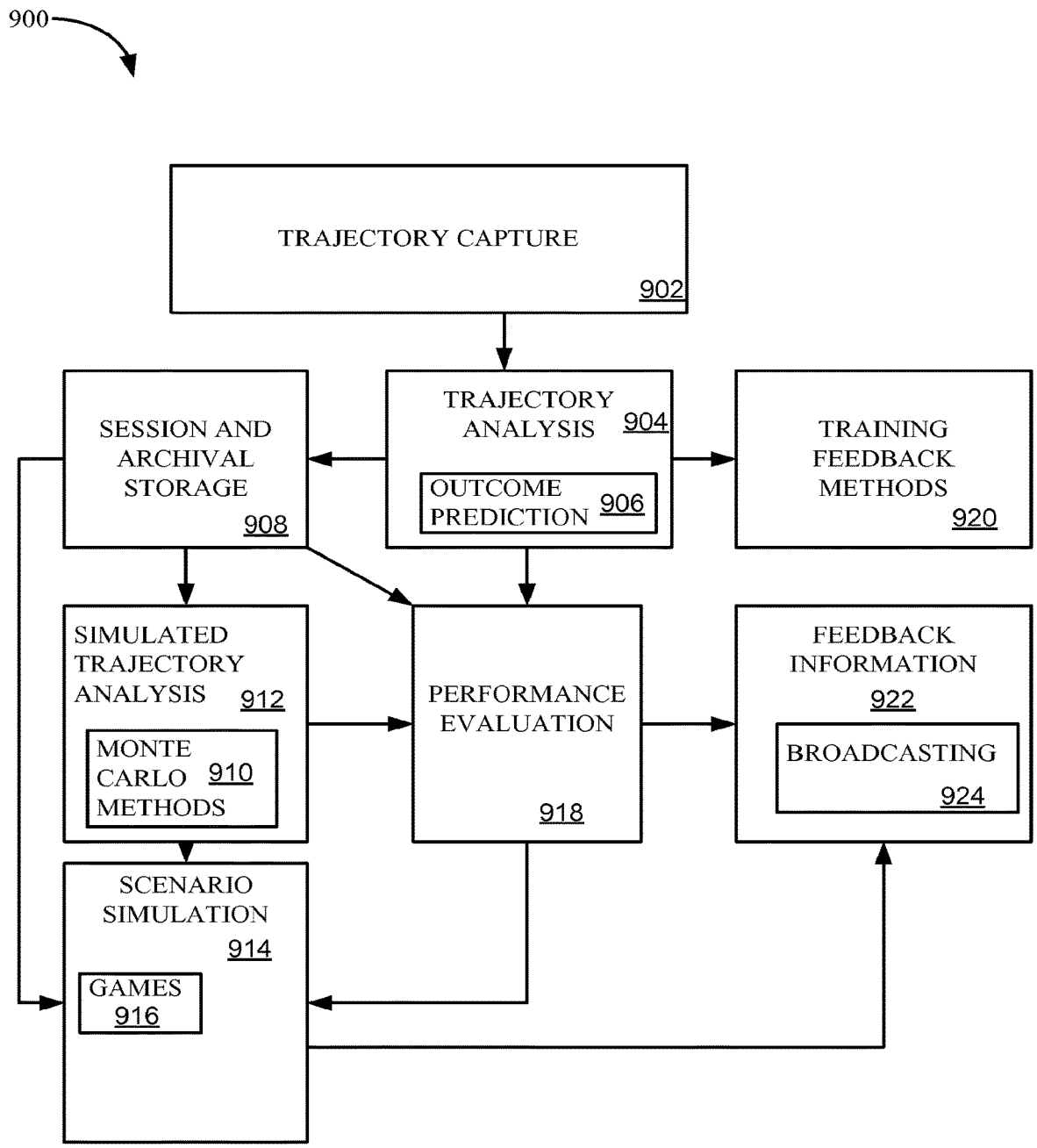
FIG. 9 is a block diagram of a system including true space tracking of axisymmetric object flight using 2-D image data in accordance with the described embodiments.

FIG. 9 is a block diagram of a system 900 including true space tracking of axisymmetric object flight (or object with an identifiable characteristic length) using 2-D image data in accordance with the described embodiments. The components described with respect to FIG. 9 can be implemented on a single electronic device, such as a smart phone or divided between multiple devices. Each electronic device can include one or more processors, a memory and network interfaces, such as wireless or wired communication interfaces. When the components are divided between multiple devices, the network interfaces can allow communication between the devices.

In further detail, in one embodiment, a camera, sensors and processor can be located on a mobile computing device where the mobile computing device is used to perform the trajectory analysis. In another embodiment, a camera and sensors can be located in a first device and the trajectory determination can be performed on a separate device. For example, a first device including a camera and sensors can be mounted to a wall or a tripod where the first device can be configured to communicate image and/or sensor data to a second device. The second device can be configured to perform the trajectory determination including the object identification in the image data.

In yet another embodiment, a camera and/or sensor device can be worn. For example, a person can were glasses including a camera. The camera can transmit images to a second device, such as a mobile phone, where the mobile phone performs the object identification and/or trajectory determination.

The captured 3-D trajectory data 902 may be used to perform trajectory analysis 122. The trajectory analysis 122 may be used to generate parameters which characterize a particular trajectory. For example, for golf, a velocity and direction at which a golf ball leaves a club after being struck with a club can be determined, for tennis, a velocity and direction at which the tennis ball leaves the racket after being struck with the racquet can be determined and for basketball, a velocity and direction at which the ball leaves a shooters hand can be determined.

The trajectory capture 902 may only provide data related to a portion of a trajectory, such as a beginning, middle or end portion of a trajectory. Using a trajectory analysis methodology, other portions of a trajectory which are not characterized can be simulated. In particular, after an initial portion of a trajectory is captured, a subsequent portion of the trajectory may be predicted. For instance, data regarding a player shooting a basketball may be used to predict whether the shot goes through a hoop or not or how far a home run ball would travel. In another example, data regarding a golfer striking a golf ball may be used to predict a location where the golf ball will land, such as on a green, when the 2-D image data doesn't have sufficient resolution to allow the golf ball to be tracked to the end of its trajectory or the end of its trajectory is obscured in some manner, such as from trees or hills.

Method and apparatus related to trajectory predictions may be referred to as outcome prediction 906. As another example, based upon images of a basketball approaching a basketball hoop, it may be possible to predict the velocity, direction and angle of the ball as it left the shooters hand. Thus, the beginning of a trajectory is predicted based on image data captured near the end of the trajectory.

Trajectory analysis 904 and outcome prediction 906 may be used as part of training methodologies that help a player to develop consistency in reproducing the factors that result in a particular trajectory of a ball and thus, improve their skill level. Developing correct muscle memory is a term that is often associated with training methodologies that help a player develop a skill in a sport. The method and apparatus described herein may be used to provide feedback information as part of training feedback methods 920 that help a player develop consistent muscle memory for an activity associated with a particular sport.

Data related to trajectory capture 902 and trajectory analysis 906 may be stored and archived 908 and later utilized for a number of different purposes. These purposes may include but are not limited to a) simulating trajectories 912 including utilizing Monte Carlo methods 910 and b) scenario simulation 914 which may include applications related to 2-D and 3-D rendered games 914. In one embodiment, the simulated trajectory analysis 912 may be used to quantify and determine optimum trajectory factors for a particular trajectory, such as the best angle at which to launch a shot of a basketball.

The trajectory analysis 904, archived data 908, simulated trajectory analysis 912 and scenario simulation 914 may be used to evaluate the performance 918 of individual participants or groups of participants. The evaluation of the performance may comprise quantifying a participant's ability to reproduce the factors related to generating a particular trajectory. Once a player's ability is quantified in some manner, the evaluation of performance 918 may include comparing 1) a participants performance against himself, such as past performance against a current performance, 2) comparing a participant's performance against another participants performance, 3) comparing a participant's performance against a defined standard, such as placing the participant's performance within a defined skill ranking and 4) comparing a participant's to some optimum, such as a comparing averages of factors that a player produces to generate a particular trajectory against optimum values of these factors determined from a simulated trajectory analysis 912.

In one embodiment, the performance evaluation 918 may include predictions of future performance, such as an improvement in performance that an individual might make if the individual were to change some aspect in the manner in which they generate the factors that produce a particular trajectory or were to improve a consistency in which they generate the factors that produce a particular trajectory. This type of analysis might be performed using the simulated trajectory analysis 912 including the Monte Carlo methods 912. In another embodiment, the performance evaluation 918 may include a prediction of future performance, such as a win differential, that a group may make if the individuals in the group were to change some aspect in the manner in which they generate the factors that produce a particular trajectory or were to improve a consistency in which they generate the factors that produce a particular trajectory, such as if a basketball team improved the consistency at which they generated free throws. This type of prediction may include scenario simulation 914.

In addition, a performance evaluation may be developed for a "composite" participant. For example, in basketball, the consistency at which a group of participants generate factors that produce shot against a particular defender may be determined. The shots made by each player against the defender may be treated as if a single player had made each of the shots and analyzed accordingly. In another example, the consistency at which a group of participants in golf on a particular golf hole generate a shot may be determined. The shots made by the group of participants may be treated as if a single player had made each of the shots on the selected hole. The evaluation of performance for a composite player may involve similar comparisons as described in the previous paragraph for an individual player Once performance is evaluated for an individual player, group of players or a composite player, feedback information 922 may be provided. In many instances, the feedback information may be provided in a graphical format where the graphical format provides some indication of a level consistency at which the factors that produce a particular trajectory are being generated. In a particular embodiment, the feedback information 922 may be utilized in a real-time sports environment, such as during a televised sporting event.

Methods and apparatus related to outcome prediction 906, simulated trajectory analysis 912 including Monte Carlo methods, performance evaluation 918, feedback information 922 including broadcasting 924 and scenario simulation 914 including games 916 are can be utilized with the 3-D trajectory determination described herein. Additional details regarding these elements are also described with respect to U.S. application Ser. No. 11/507,886, filed Aug. 21, 2006 and titled, "TRAJECTORY DETECTION AND FEEDBACK SYSTEM," and U.S. application Ser. No. 13/745,429, titled "TRAJECTORY DETECTION AND FEEDBACK SYSTEM FOR TENNIS," filed Jan. 18, 2013, by Marty, et al., each of which is incorporated by reference in its entirety and for all purposes.

Embodiments of the present invention further relate to computer readable media that include executable program instructions for performing recruiting techniques described herein. The media and program instructions may be those specially designed and constructed for the purposes of the present invention, or any kind well known and available to those having skill in the computer software arts. When executed by a processor, these program instructions are suitable to implement any of the methods and techniques, and components thereof, described above. Examples of non-transitory computer-readable media include, but are not limited to, magnetic media such as hard disks, semiconductor memory, optical media such as CD-ROM disks; magneto-optical media such as optical disks; and hardware devices that are specially configured to store program instructions, such as read-only memory devices (ROM), flash memory devices, EEPROMs, EPROMs, etc. and random access memory (RAM). Examples of program instructions include both machine code, such as produced by a compiler, and files containing higher-level code that may be executed by the computer using an interpreter.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

While the embodiments have been described in terms of several particular embodiments, there are alterations, permutations, and equivalents, which fall within the scope of these general concepts. It should also be noted that there are many alternative ways of implementing the methods and apparatuses of the present embodiments. It is therefore intended that the following appended claims be interpreted as including all such alterations, permutations, and equivalents as fall within the true spirit and scope of the described embodiments.

What is claimed is:

1. A mobile computing device for use in basketball, comprising
   a digital camera for capturing a plurality of two-dimensional (2D) images; and
   at least one processor programmed with instructions that, when executed by the at least one processor, cause the at least one processor to:
      identify a basketball hoop within the plurality of 2D images based on a shape of the basketball hoop within the plurality of 2D images;
      determine a position of the basketball hoop in three-dimensional (3D) space based on at least one of the identified basketball hoop and a backboard coupled to the identified basketball hoop;
      identify a secondary object in the plurality of 2D images;
      determine a position of the secondary object in 3D space based on at least a first 2D image of the plurality of 2D images;
      identify a basketball within the plurality of 2D images;
      when the basketball is launched toward the basketball hoop, determine a plurality of 2D locations of the basketball along a trajectory of the basketball toward the basketball hoop based on the plurality of 2D images;
      determine a position of the basketball in 3D space for at least one of the 2D locations based on the determined position of the secondary object in 3D space and a location of the basketball relative to the secondary object in at least a second 2D image of the plurality of 2D images;
      determine a trajectory of the basketball in 3D space based on the plurality of 2D locations, the position of the basketball hoop in 3D space, and the position of the basketball in 3D space;
      determine an orientation of the digital camera in 3D space based on at least one of the shape of the basketball hoop and the backboard within the plurality of 2D images; and
      based on the determined trajectory, provide feedback indicative of a performance of a user in launching the basketball toward the basketball hoop.

2. The mobile computing device of claim 1, wherein the instructions, when executed by the at least one processor, cause the at least one processor to determine the position of the basketball hoop in 3D space based on a size of the basketball hoop within the plurality of 2D images.

3. The mobile computing device of claim 1, wherein the mobile communication device is a smart phone.

4. The mobile computing device of claim 1, wherein the mobile communication device is a tablet computer.

5. The mobile computing device of claim 1, wherein the instructions, when executed by the at least one processor, cause the at least one processor to determine, based on the determined trajectory, an angle at which the basketball is launched along the trajectory, and wherein the feedback indicates the angle.

6. The mobile computing device of claim 1, wherein determination of the position of the secondary object in 3D space is based on a size of the secondary object in the plurality of 2D images and a size for the secondary object specified by a user input.

7. The mobile computing device of claim 1, wherein the secondary object is a marking on a basketball court for the basketball hoop.

8. The mobile computing device of claim 1, wherein the secondary object is the user.

9. The mobile computing device of claim 1, wherein the instructions, when executed by the at least one processor, cause the at least one processor to determine the orientation of the digital camera in 3D space based on the shape of the basketball hoop within the plurality of 2D images.

10. The mobile computing device of claim 9, wherein the instructions, when executed by the at least one processor, cause the at least one processor to determine the position of the basketball hoop in 3D space based on a size of the basketball hoop within the plurality of 2D images.

11. A mobile computing device for use in basketball, comprising
a digital camera for capturing a plurality of two-dimensional (2D) images; and
at least one processor programmed with instructions that, when executed by the at least one processor, cause the at least one processor to:
identify a basketball hoop within the plurality of 2D images based on a shape of the basketball hoop within the plurality of 2D images;
determine a distance to the digital camera of the basketball hoop or a backboard coupled to the basketball hoop within the plurality of 2D images;
determine an orientation of the basketball hoop to the digital camera based on at least one of the shape of the basketball hoop and the backboard within the plurality of 2D images;
determine a position of the basketball hoop in three-dimensional (3D) space based on the identified basketball hoop, the determined distance, and the determined orientation;
identify a basketball within the plurality of 2D images;
when the basketball is launched toward the basketball hoop, determine a plurality of 2D locations of the basketball along a trajectory of the basketball toward the basketball hoop;
determine a trajectory of the basketball in 3D space based on the plurality of 2D locations and the position of the basketball hoop in 3D space; and
based on the determined trajectory, provide feedback indicative of performance of a user in launching the basketball toward the basketball hoop.

12. The mobile computing device of claim 11, wherein the determined distance is of the basketball hoop to the digital camera and is based on a size of the basketball hoop within the plurality of 2D images.

13. The mobile computing device of claim 11, wherein the instructions, when executed by the at least one processor, cause the at least one processor to:
identify a secondary object in the plurality of 2D images;
determine a position of the secondary object in 3D space;
determine a position of the basketball in 3D space for at least one of the 2D locations based on the determined position of the secondary object in 3D space and a location of the basketball relative to the secondary object in the plurality of 2D images; and
determine the trajectory of the basketball in (3D) space based on the position of the basketball in 3D space.

14. The mobile computing device of claim 13, wherein determination of the position of the secondary object in 3D space is based on a size of the secondary object in the plurality of 2D images and a size for the secondary object specified by a user input.

15. The mobile computing device of claim 13, wherein the secondary object is a marking on a basketball court for the basketball hoop.

16. The mobile computing device of claim 13, wherein the secondary object is the user.

17. A method for use in basketball, comprising:
capturing a plurality of two-dimensional (2D) images with a digital camera;
identifying a basketball hoop within the plurality of 2D images with at least one processor based on a shape of the basketball hoop within the plurality of 2D images;
determining, with the at least one processor, a position of the basketball hoop in three-dimensional (3D) space based on at least one of the identified basketball hoop and a backboard coupled to the identified basketball hoop;
identifying, with the at least one processor, a secondary object in the plurality of 2D images;
determining, with the at least one processor, a position of the secondary object in 3D space based on at least a first 2D image of the plurality of 2D images;
identifying, with the at least one processor, a basketball within the plurality of 2D images;
when the basketball is launched toward the basketball hoop, determining with the at least one processor a plurality of 2D locations of the basketball along a trajectory of the basketball toward the basketball hoop based on the plurality of 2D images;
determining, with the at least one processor, a position of the basketball in 3D space for at least one of the 2D locations based on the determined position of the secondary object in 3D space and a location of the basketball relative to the secondary object in at least a second 2D image of the plurality of 2D images;
determining, with the at least one processor, a trajectory of the basketball in 3D space based on the plurality of 2D locations, the position of the basketball hoop in 3D space, and the position of the basketball in 3D space;
determining, with the at least one processor, an orientation of the digital camera in 3D space based on at least one of the shape of the basketball hoop and the backboard within the plurality of 2D images; and
based on the determined trajectory, providing feedback to a user, the feedback indicative of a performance of the user in launching the basketball toward the basketball hoop.

18. The method of claim 17, further comprising determining, with the at least one processor, the position of the basketball hoop in 3D space based on a size of the basketball hoop within the plurality of 2D images.

19. The method of claim 17, further comprising determining, with the at least one processor based on the determined trajectory, an angle at which the basketball is launched along the trajectory, wherein the feedback indicates the angle.

20. The method of claim 17, further comprising receiving, with the at least one processor, a user input indicating a size of the secondary object, wherein the determining the position of the secondary object in 3D space is based on a size of the secondary object in the plurality of 2D images and the size of the secondary object indicated by the user input.

21. The method of claim 17, wherein the secondary object is a marking on a basketball court for the basketball hoop.

22. The method of claim 17, wherein the secondary object is the user.

23. The method of claim 17, further comprising determining, with the at least one processor, the orientation of the digital camera in 3D space based on the shape of the basketball hoop within the plurality of 2D images.

24. The method of claim 23, wherein the determining the position of the basketball hoop in 3D space is based on a size of the basketball hoop within the plurality of 2D images.

25. A method, comprising
capturing a plurality of two-dimensional (2D) images with a digital camera;
identifying, with at least one processor, a basketball hoop within the plurality of 2D images based on a shape of the basketball hoop within the plurality of 2D images;
determining, with the at least one processor, a distance to the digital camera of the basketball hoop or a backboard coupled to the basketball hoop within the plurality of 2D images;
determining, with the at least one processor, an orientation of the basketball hoop to the digital camera based on at least one of the shape of the basketball hoop and the backboard within the plurality of 2D images;
determining, with the at least one processor, a position of the basketball hoop in three-dimensional (3D) space based on the identified basketball hoop, the determined distance, and the determined orientation;
identifying, with the at least one processor, a basketball within the plurality of 2D images;
when the basketball is launched toward the basketball hoop, determining with the at least one processor a plurality of 2D locations of the basketball along a trajectory of the basketball toward the basketball hoop;
determining, with the at least one processor, a trajectory of the basketball in 3D space based on the plurality of 2D locations and the position of the basketball hoop in 3D space; and
based on the determined trajectory, providing feedback to a user, the feedback indicative of performance of the user in launching the basketball toward the basketball hoop.

26. The method of claim 25, wherein the determined distance is of the basketball hoop to the digital camera and is based on a size of the basketball hoop within the plurality of 2D images.

27. The method of claim 25, further comprising:
identifying, with the at least one processor, a secondary object in the plurality of 2D images;
determining, with the at least one processor, a position of the secondary object in 3D space;
determining, with the at least one processor, a position of the basketball in 3D space for at least one of the 2D locations based on the determined position of the secondary object in 3D space and a location of the basketball relative to the secondary object in the plurality of 2D images; and
determining, with the at least one processor, the trajectory of the basketball in (3D) space based on the position of the basketball in 3D space.

28. The method of claim 25, further comprising receiving, with the at least one processor, a user input indicating a size of the secondary object, wherein the determining the position of the secondary object in 3D space is based on a size of the secondary object in the plurality of 2D images and the size of the secondary object indicated by the user input.

29. The method of claim 25, wherein the secondary object is a marking on a basketball court for the basketball hoop.

30. The method of claim 25, wherein the secondary object is the user.

* * * * *